US009150282B2

(12) United States Patent
Heyring et al.

(10) Patent No.: US 9,150,282 B2
(45) Date of Patent: Oct. 6, 2015

(54) CONTROL OF MULTI-HULLED WATER CRAFT

(71) Applicant: Nauti-Craft Pty Ltd, Margaret River (AU)

(72) Inventors: Christopher Brian Heyring, Eagle Bay (AU); John Gerard Catoni, Dunsborough (AU); Richard Monk, Busselton (AU)

(73) Assignee: Nauti-Craft Pty Ltd, Dunsborough (AU)

( * ) Notice: Subject to any disclaimer, the term of this patent is extended or adjusted under 35 U.S.C. 154(b) by 196 days.

(21) Appl. No.: 13/678,944

(22) Filed: Nov. 16, 2012

(65) Prior Publication Data
US 2013/0068150 A1  Mar. 21, 2013
US 2013/0233225 A2  Sep. 12, 2013

Related U.S. Application Data

(63) Continuation of application No. PCT/AU2011/000557, filed on May 16, 2011.

(30) Foreign Application Priority Data

May 16, 2010  (AU) .................................. 2010902084
Mar. 1, 2011  (AU) .................................. 2011900704

(51) Int. Cl.
*B63B 1/14* (2006.01)
*B63B 39/00* (2006.01)

(52) U.S. Cl.
CPC .. *B63B 1/14* (2013.01); *B63B 39/00* (2013.01)

(58) Field of Classification Search
CPC .................................. B63B 1/22; B63B 1/14
USPC .............. 114/61.1–61.19, 283; 280/124.161, 280/124.104, 124.106; 440/100, 440/12.5–12.54, 12.57
See application file for complete search history.

(56) References Cited

U.S. PATENT DOCUMENTS

| | | | | |
|---|---|---|---|---|
| 2,184,202 | A * | 12/1939 | Tschanz | 280/5.506 |
| 2,725,109 | A * | 11/1955 | Bouvier | 180/6.48 |
| 3,528,380 | A * | 9/1970 | Yost | 114/283 |
| 5,107,783 | A | 4/1992 | Magazzu | 114/123 |
| 6,010,139 | A * | 1/2000 | Heyring et al. | 280/124.104 |
| 6,270,098 | B1 | 8/2001 | Heyring et al. | 280/124.161 |

(Continued)

FOREIGN PATENT DOCUMENTS

WO     WO 98/18641     5/1998

OTHER PUBLICATIONS

Australian Patent Office, International Search Report, PCT/AU2011/000557, date of mailing Aug. 24, 2011, 2 pages.

*Primary Examiner* — Edwin Swinehart
(74) *Attorney, Agent, or Firm* — Sunstein Kann Murphy & Timbers LLP

(57) ABSTRACT

A water craft has a body portion and at least two water engaging means. The body portion is at least partially suspended above the at least two water engaging means by a suspension system, and locating means are provided to connect each water engaging means to the body portion to permit substantially vertical and pitch direction motions of the water engaging means relative to the body. The suspension system includes at least one front pitch support ram and at least one back pitch support ram, the front and back pitch support rams providing support for at least a portion of the body relative to the at least two water engaging means.

24 Claims, 17 Drawing Sheets

(56) References Cited

U.S. PATENT DOCUMENTS

| | | |
|---|---|---|
| 7,047,896 B2 | 5/2006 | Van Dijk |
| 7,314,014 B2 | 1/2008 | Heyring et al. ............ 114/61.15 |
| 7,913,636 B2 * | 3/2011 | Meyer ........................... 114/283 |
| 2009/0227159 A1 | 9/2009 | Meyer |
| 2010/0132602 A1 | 6/2010 | Pereira ........................ 114/55.5 |

* cited by examiner

CONTROL OF MULTI-HULLED WATER CRAFT

This Application is a continuation of Patent Cooperation Treaty Patent Application PCT/AU2011/000557 filed May 16, 2011, which is incorporated herein by reference.

TECHNICAL FIELD

The present invention relates to water craft having a body supported above multiple hulls, and more particularly to the control of the attitude of the body above those hulls.

BACKGROUND ART

It is known to provide a single-hull displacement type water craft which is capable of moving relatively efficiently through a body of water at low speed. However, as the speed increases, it is known that craft with multiple long slender hulls (such as catamarans) provide improved efficiency. As speeds increase further it is known to provide planing-type water craft which significantly reduce the volume of water displaced when planing and therefore provide increased efficiency at high speeds. The hulls of planing water craft are generally wider (especially towards the rear) and shorter than displacement water craft.

The applicant's U.S. Pat. No. 7,314,014, details of which are incorporated herein by reference, discloses a water craft having a chassis and least four water engaging means. This prior invention is applicable to displacement and planing craft uses, providing suspension to reduce shocks to the body of the water craft, especially when travelling at speed over turbulent water. The vertical displacement of each water engaging means relative to the chassis is controlled by a suspension system providing interconnected hydraulic rams to maintain the chassis at a substantially constant height and orientation relative to the average surface of the water (as defined by the water engaging means). However as waves are encountered, the average surface of the water does not remain level, causing the body of the water craft to experience corresponding roll or pitch.

It is therefore an object of the present invention to provide an improved control of the roll and/or pitch attitude of the body of a water craft.

SUMMARY

In accordance with an aspect of the present invention, there is provided a water craft comprising a body portion and at least two water engaging means, the body portion being at least partially suspended above the at least two water engaging means by a suspension system, locating means being provided to connect each water engaging means to the body portion to permit substantially vertical and pitch direction motions of the water engaging means relative to the body, the suspension system including: at least one front pitch support ram and at least one back pitch support ram, the front and back pitch support rams providing support for at least a portion of the body relative to the at least two water engaging means; the at least one front pitch support ram including at least a compression chamber forming a front pitch compression volume and the at least one back pitch support ram including at least a compression chamber forming a back pitch compression volume; and a body pitch conduit connected between the front pitch compression volume and the back pitch compression volume, the body pitch conduit including a body pitch device dividing the body pitch conduit into a front body pitch conduit portion and a back body pitch conduit portion, the body pitch device controlling the effective flow of fluid between the body pitch conduit front and back portions. That is, the body pitch device controls the flow of fluid through the front body pitch conduit portion and the back body pitch conduit portion, into and out of the front and back pitch compression volumes.

In one arrangement, the at least two water engaging means may be a single front water engaging means and a single back water engaging means, the single front and rear water engaging means being longitudinally spaced and substantially aligned along a longitudinal axis.

In an alternative arrangement there may be provided at least 3 water engaging means, wherein two of said water engaging means are laterally spaced, each of the two laterally spaced water engaging means including a respective left or right roll ram, each roll ram including a compression chamber at least partially forming a respective left roll compression volume or right roll compression volume.

In one such alternative arrangement having at least three water engaging means, each said left and right roll ram may be a single acting ram and the water craft may comprise a body roll conduit connected between the left roll compression volume and the right roll compression volume, the body roll conduit including a body roll device dividing the body roll conduit into a left body roll conduit portion and a right body roll conduit portion, the body roll device controlling the effective flow of fluid between the body roll conduit left and right portions. That is, the body roll device controls the flow of fluid through the left body roll conduit portion and the right body roll conduit portion, into and out of (or towards and away from) the left and right roll compression volumes.

In another alternative arrangement having at least three water engaging means, each said left and right roll ram may be a double acting ram, each double acting ram including a rebound chamber, the compression chamber of the left roll ram being connected to the rebound chamber of the right roll ram so as to form the left roll compression volume, and the compression chamber of the right roll ram being connected to the rebound chamber of the left roll ram so as to form the right roll compression volume.

In another alternative arrangement having at least three water engaging means, the at least three water engaging means may be a front left water engaging means, a front right water engaging means and a single back water engaging means longitudinally spaced from the front left and front right water engaging means.

In another alternative arrangement having at least three water engaging means, the at least three water engaging means may be a single front water engaging means, a back left water engaging means and a back right water engaging means.

In another alternative arrangement having at least three water engaging means, the at least three water engaging means may include at least one front water engaging means, at least one back water engaging means and the two laterally spaced water engaging means.

Alternatively the at least three water engaging means may include a front and a back water engaging means with multiple longitudinally spaced pairs of laterally spaced water engaging means for example.

In an alternative arrangement, the at least two water engaging means may be a left water engaging means and a right water engaging means, the at least one front pitch support ram including a front left pitch support ram and a front right pitch support ram, and the at least one back pitch support ram including a back left pitch support ram and a back right pitch support ram, the front left pitch support ram and the back left pitch support ram being disposed between the left water engaging means and the body portion, the front right pitch support ram and the back right pitch support ram being disposed between the right water engaging means and the body portion, (each of said front left, front right, back left and back right pitch support rams including a respective compression chamber at least partially forming a respective pitch compression volume). In this case the two water engaging means may be laterally spaced and the water craft may be of a type commonly referred to as a catamaran.

In another alternative arrangement having at least two water engaging means, at least a front left water engaging means, a front right water engaging means, a back left water engaging means and a back right water engaging means may be provided (the front left and front right water engaging means may preferably be laterally spaced, and the back left and back right water engaging means may preferably be laterally spaced). The at least one front pitch support ram may include a front left pitch support ram and a front right pitch support ram disposed between said water engaging means and the body portion, and the at least one back pitch support ram may include a back left pitch support ram and a back right pitch support ram disposed between said water engaging means and the body portion. Each of said front left, front right, back left and back right pitch support rams may include a respective compression chamber at least partially forming a respective pitch compression volume. In this case the water craft may have two longitudinally spaced pairs of laterally spaced water engaging means.

When the water craft has one or two pairs of laterally spaced water engaging means, optionally the compression chamber of the front left pitch support ram may be connected to the compression chamber of the back left pitch support ram by a left body pitch conduit, the left body pitch conduit including a left body pitch device dividing the left body pitch conduit into a left body pitch conduit front portion and a left body pitch conduit back portion, and the compression chamber of the front right pitch support ram is connected to the compression chamber of the back right pitch support ram by a right body pitch conduit, the right body pitch conduit including a right body pitch device dividing the right body pitch conduit into a right body pitch conduit front portion and a right body pitch conduit back portion, each of the respective left and right body pitch devices controlling the effective flow of fluid between the respective body pitch conduit front and back portions. That is, the respective left and right body pitch devices control the flow of fluid through the respective body pitch conduit front and back portions into and out of (or towards and away from) the respective front and back pitch compression volumes. Additionally, the left body pitch device and the right body pitch device may be integrated into a single body pitch device, controlling the effective flow of fluid between the respective body pitch conduit front and back portions.

When the water craft has one or two pairs of laterally spaced water engaging means, alternatively the compression chamber of the front left pitch support ram may connected to the compression chamber of the front right pitch support ram by a front pitch compression conduit so as to form the front pitch compression volume, and the compression chamber of the back left pitch support ram may be connected to the compression chamber of the back right pitch support ram by a back pitch compression conduit so as to form the back pitch compression volume, the pitch support rams thereby providing substantially no roll stiffness to resist roll motions of the body portion of the water craft. The water craft may further include a respective roll ram for each water engaging means, wherein each roll ram includes at least a compression chamber, the compression chambers of the front left and back left roll rams forming at least one left roll compression volume and the compression chambers of the front right and back right roll rams forming at least one right roll compression volume.

In one arrangement having a respective roll ram for each water engaging means, each roll ram may be single acting, the compression chambers of the front left and back left roll rams being connected together to form a single left roll compression volume and the compression chambers of the front right and back right roll rams being connected together to form a single right roll compression volume.

In one arrangement having a respective roll ram for each water engaging means, each roll ram may further include a rebound chamber, the rebound chamber of the front left roll ram being connected to the compression chamber of the front right ram so as to form a front right roll compression volume, the rebound chamber of the front right roll ram being connected to the compression chamber of the front left ram so as to form a front left roll compression volume, and the rebound chamber of the back left roll ram being connected to the compression chamber of the back right ram so as to form a back right roll compression volume, the rebound chamber of the back right roll ram being connected to the compression chamber of the back left ram so as to form a back left roll compression volume.

In an alternative arrangement having a respective roll ram for each water engaging means, each roll ram may further include a rebound chamber, the front left roll ram compression chamber, front right roll ram rebound chamber, back left roll ram compression chamber and back right roll ram rebound chamber being interconnected to form a left roll compression volume, and the front right roll ram compression chamber, front left roll ram rebound chamber, back right roll ram compression chamber and back left roll ram rebound chamber being interconnected to form a right roll compression volume.

In an alternative arrangement having at least one left roll ram forming part of at least one left roll compression volume and at least one right roll ram forming part of at least one right roll compression volume, at least one of said roll compression volumes may be in fluid communication with a respective resilient device. The resilient device may be at least one fluid pressure accumulator.

In an alternative arrangement having at least one left roll ram forming part of at least one left roll compression volume and at least one right roll ram forming part of at least one right roll compression volume, a fluid pressure control system may be provided including a fluid pump and at least one valve (to selectively communicate the fluid pressure control system with at least one of the left or right roll compression volumes) to thereby enable control of the roll attitude of the body.

In an alternative arrangement having at least one left roll ram forming part of at least one left roll compression volume and at least one right roll ram forming part of at least one right roll compression volume, a body roll conduit may be connected between the at least one left roll compression volume and the at least one right roll compression volume, the body roll conduit including a body roll device dividing the body roll conduit into a body roll conduit left portion and a body roll conduit right portion, the body roll device controlling the effective flow of fluid between the body roll conduit left and right portions. That is, the body roll device may control the flow of fluid through the body roll conduit left portion and the body roll conduit right portion, into and out of (or towards and away from) the left and right roll compression volumes.

In another arrangement, for each of said at least one forward water engaging means there may be provided two body pitch support rams being a forward pitch support ram and a rearward pitch support ram, each forward and rearward pitch support ram including a respective compression chamber, the forward pitch support ram compression chamber of said at least one forward water engaging means forming a front forward pitch volume and the rearward pitch support ram compression chamber of said at least one forward water engaging means forming a front rearward pitch volume, a front heave device being provided comprising a first cylinder and a second cylinder axially aligned with and larger in diameter than the first cylinder, a piston rod assembly located within and axially aligned with the first and second cylinders and including at least a piston on one end located within the second cylinder, the piston rod assembly forming a first chamber in the first cylinder and forming a second chamber and a third chamber in the second cylinder, the first and second chambers varying in volume in the same direction with motion of the piston rod assembly and in the opposite direction to the third chamber, the first chamber being connected to the front forward pitch volume and the second chamber being connected to the second chamber, the third chamber thereby displacing a fluid volume substantially equal to the sum of the fluid volume displaced by (into or out of) the first and second chambers with motion of the piston rod assembly, the third chamber being connected to the front portion of the body pitch conduit. To clarify the functionality of the construction of the heave device, when the piston rod assembly moves such that the first chamber increases in size, the second chamber also increases in size and the third chamber decreases in size.

Similarly, for each of said at least one rearward water engaging means there may be provided two body pitch support rams being a forward pitch support ram and a rearward pitch support ram, each forward and rearward pitch support ram including a respective compression chamber, the forward pitch support ram compression chamber of said at least one rearward water engaging means forming a back forward pitch volume and the rearward pitch support ram compression chamber of said at least one rearward water engaging means forming a back rearward pitch volume, a back heave device being provided comprising a first cylinder and a second cylinder axially aligned with and larger in diameter than the first cylinder, a piston rod assembly located within and axially aligned with the first and second cylinders and including at least a piston on one end located within the second cylinder, the piston rod assembly forming a first chamber in the first cylinder and forming a second chamber and a third chamber in the second cylinder, the first and second chambers varying in volume in the same direction with motion of the piston rod assembly and in the opposite direction to the third chamber, the first chamber being connected to the front forward pitch volume and the second chamber being connected to the second chamber, the third chamber thereby displacing a fluid volume substantially equal to the sum of the fluid volume displaced by (into or out of) the first and second chambers with motion of the piston rod assembly, the third chamber being connected to the back portion of the body pitch conduit.

At least the at least one rearward water engaging means may include a back left water engaging means and a back right water engaging means, the compression chamber of the forward pitch support ram of the back left water engaging means being connected to the compression chamber of the forward pitch support ram of the back right water engaging means so as to form the back forward pitch volume, and the compression chamber of the rearward pitch support ram of the back left water engaging means being connected to the compression chamber of the rearward pitch support ram of the back right water engaging means so as to form the back rearward pitch volume.

In an alternative arrangement, the at least one front pitch support ram may further include at least one rebound chamber forming a front pitch rebound volume, the front pitch rebound volume being connected to and forming part of the back pitch compression volume.

Alternatively or additionally, the at least one back pitch support ram may further include at least one rebound chamber forming a back pitch rebound volume, the back pitch rebound volume being connected to and forming part of the front pitch compression volume.

The body pitch device may include a front body pitch valve and a back body pitch valve, the body pitch device further including a body pitch conduit mid portion between the front and back body pitch valves and at least one fluid pressure accumulator in fluid communication with the body pitch conduit mid portion.

Alternatively or additionally, the body pitch device may include: a front body pitch valve, a mid body pitch valve and a back body pitch valve; the body pitch device further including a body pitch conduit front mid portion between the front and mid body pitch valves and a body pitch conduit back mid portion between the mid and back body pitch valves; at least one fluid pressure accumulator being provided in fluid communication with the body pitch conduit front mid portion and at least one fluid pressure accumulator being provided in fluid communication with the body pitch conduit back mid portion.

Alternatively or additionally the (or each) body pitch device may include a pitch displacement device. The pitch displacement device may include at least two cylinders and a piston rod assembly slidably located in the at least two cylinders, the at least two cylinders and piston rod forming at least a front pitch modal chamber connected to the front pitch compression volume, a back pitch modal chamber connected to the back pitch compression volume, a front pitch resilience chamber and a back pitch resilience chamber, the front pitch chamber varying in volume in the same direction as the back pitch resilience chamber and in the opposite direction to the back pitch chamber and the front pitch resilience chamber with motion of the piston rod assembly relative to the at least two cylinders. That is for example, when the front pitch chamber increases in volume, the back pitch resilience chamber also increase in volume and the back pitch chamber and front pitch resilience chamber both reduce in volume.

At least one of said front and back pitch compression volumes may be in fluid communication with a resilient device. The resilient device for at least one pitch compression volume may be provided by at least one respective fluid pressure accumulator.

The water craft may further include a fluid pressure control system including a fluid pump and at least one valve (to selectively communicate the fluid pressure control system with at least one of the front or back pitch compression volumes) to thereby enable control of the pitch attitude of the body.

The suspension system may further include at least one independent support device (at least in function, such as a coil spring in parallel with a support ram) to provide partial support of the body.

DETAILED DESCRIPTION

Figure 1:
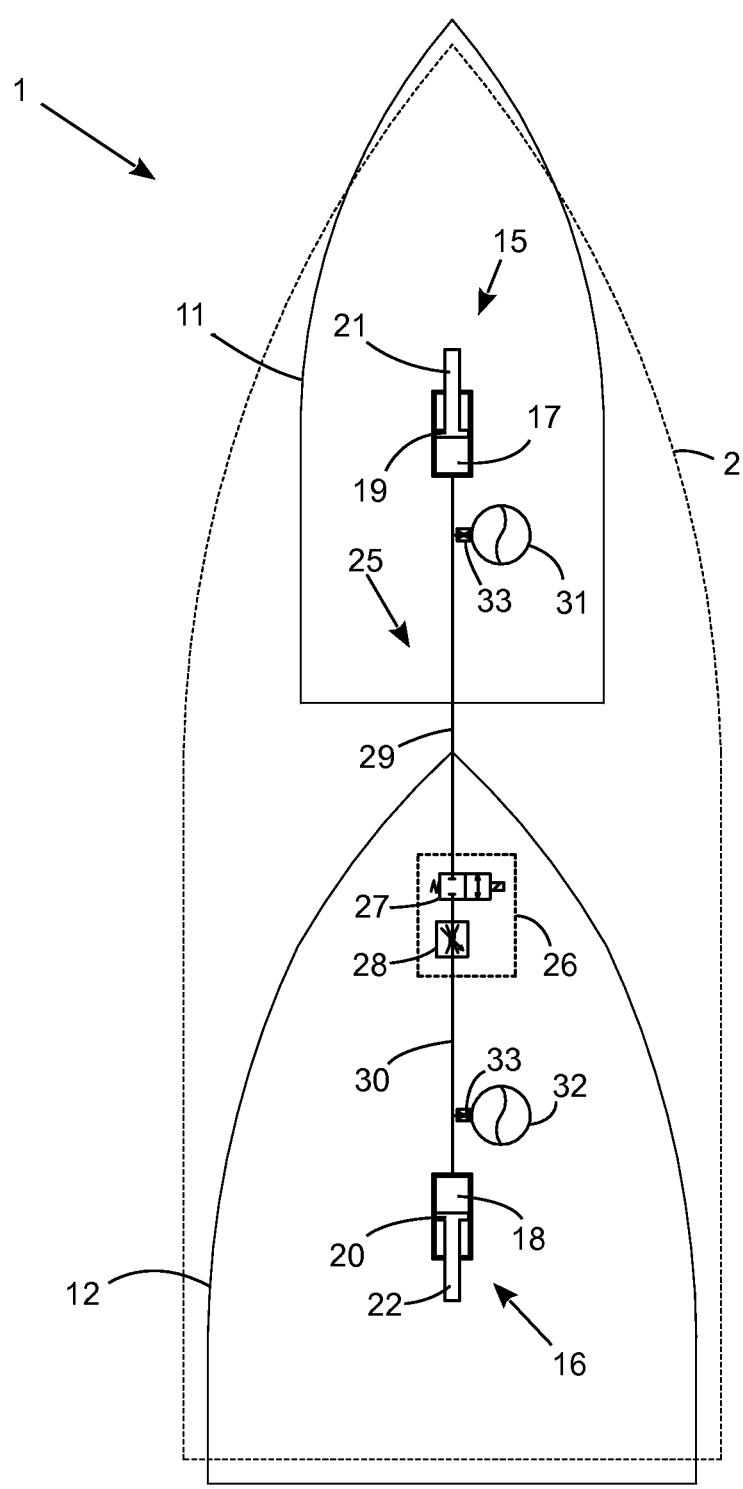
FIG. 1 is a plan view of a water craft in accordance with an embodiment of the present invention.

Referring initially to FIG. 1, there is shown a water craft 1 in accordance with an embodiment of the present invention. The water craft 1 includes a body portion or body 2, a front water engaging means 11, and a back water engaging means 12. Each water engaging means is located relative to the body by locating geometry (not shown) which permits generally vertical motion of the water engaging means with respect to the body. The locating geometry (i.e. locating means) for each water engaging means generally comprises one or more arms extending between and being pivotally connected to the body and the water engaging means. Each arm can have a number of shapes and types, for example if only one or two arms are used, they can be V-shaped (like a wishbone) or rectangular or any shape and form including box section portions to provide strength and fit in the space available for all desired positions of the water engaging means. The locating means can include any linkages commonly used in automobile suspension, such as radius arms, trailing arms, leading arms, semi-trailing arms, sliding joints, drop links and various multi-link arrangements as are well known. If more links are used for each water engaging means, some or all of them can be simple links. The arms can have various orientations which affect the path described by the water engaging means with vertical displacement relative to the body.

Each of the water engaging means 11 and 12 may be a ski, float, hull or any other suitable water engaging device. In this specification, the water engaging means will be referred to as "pods" for ease of reference.

A front pitch support ram 15 is provided between the body and the front pod 11. It can be connected between the body and the locating geometry for the front pod or directly between body and pod or between any other points which cause the ram to compress and extend with substantially motion of the pod with respect to the body. As the ram compresses with motion of the pod towards the body, pressurizing the fluid (liquid or gas, but typically hydraulic oil) in the compression chamber 17 of the ram provides a force on the piston 19 which is transmitted through the rod 21 to react the portion of the load on the front of the body.

Similarly a back pitch support ram 16 is provided between the body and the back pod 12, providing support of the portion of the load on the back of the body.

The compression chamber 17 of the front pitch support ram 15 is connected to the compression chamber 18 of the back pitch support ram 16 by a body pitch conduit 25 forming an interconnected fluid suspension system. However if the interconnection provided by the body pitch conduit was permanently open, fluid would be free to flow between the front and back pitch support ram compression chambers and the body would have no pitch support, so a body pitch device is required to control fluid flow along the body pitch conduit.

In FIG. 1 the body pitch device 26 is actually shown as a valve arrangement including a normally closed valve 27 and a variable restriction 28. The body pitch device divides the body pitch conduit into a front portion 29 and a back portion 30. The body pitch conduit front portion 29 together with the front pitch support ram compression chamber 17 form a front pitch compression volume. An optional fluid pressure accumulator 31 is shown connected to the body pitch conduit front portion, adding resilience to the front pitch compression volume. That resilience can be damped by an optional damper valve 33.

Similarly the body pitch conduit back portion 30 together with the back pitch support ram compression chamber 18 form a back pitch compression volume. An optional fluid pressure accumulator 32 is shown connected to the body pitch conduit back portion, adding resilience to the back pitch compression volume. That resilience can be damped by an optional damper valve 34.

The water-craft in FIG. 1 may be of the type known as a jet ski. As the water craft encounters a wave displacing the front pod upwards, the front pitch support ram is compressed generating an increase in fluid pressure in the front pitch compression volume. If the body pitch device 26 prevents fluid flow, then the increase in the front pitch compression volume pressure acting over the front pitch support ram piston 19 generates a force to extend the front pitch support ram. That force acting on the body accelerates the front portion of the body upwards causing pitch of the body.

However if the body pitch device 26 permits fluid flow, the increase in the front pitch compression volume pressure causes fluid flow from the front to the rear pitch compression volume to equalize the pressure between the front and back pitch compression volumes. That reduces the peak pressure in the front pitch compression volume (and therefore the upwards acceleration of the front of the water craft) while increasing the pressure in the back pitch support ram compression chamber generating a force to extend the back pitch support ram and provide a vertical acceleration of the back portion of the body. This gives an upwards acceleration at the front and back of the body providing more of a heave motion to the body than a pitch motion. As the human body tolerates heave motions better than pitch motions, this improves comfort.

The valve arrangement in the pitch device is controlled to permit fluid flow between the front and back pitch compression volumes to reduce pitching accelerations on the body, thereby improving the comfort of the water craft. The valve arrangement can be controlled using only a variable restriction 28 to allow control of the rate the fluid can flow between the front and back pitch volumes. As discussed above, the pitch device cannot permit permanent flow of any significant volume between the front and back pitch compression volumes as it removes the pitch stiffness of the suspension arrangement (of only a front and a back pitch compression volume). If the variable restriction cannot itself limit the flow such that it substantially provides a lock off or seal between the front and back pitch compression volumes, a lock-out valve 27 can be used in series as shown. Alternatively the pitch device could include only the lock-out valve 27, in which case the valve can be used either fully open and fully closed, or controlled using variable pulse lengths to provide a similar function to the variable restriction. If the body has a predisposition to pitch forwards or backwards due to the position of the center of mass for example, separate support means such as a front and/or a rear coil spring or other resilient device can be used between the front and/or rear pods and the body to help maintain the pitch attitude of the body (to provide a pitch stiffness). It is desirable to provide some form of pitch stiffness of the body relative to the longitudinally spaced pods.

The control of the pitch device in aiming to reduce pitch accelerations on the body, can use inputs such as pod displacement, velocity and/or acceleration with respect the body, or pod load, all of which can be sensed using the pod's pitch support ram displacement, velocity or acceleration and the pressure in the pitch support ram compression chamber or at another other point in the pitch compression volume. Body pitch and heave accelerations are also useful inputs to the control as is the water speed of the water craft. The water surface can even be sensed to allow the control system to anticipate the next suspension input.

Figure 2A:
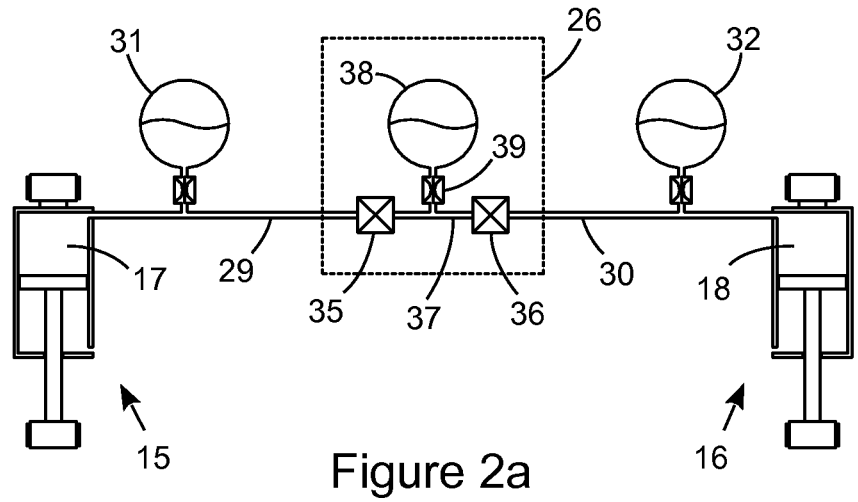
FIGS. 2a, 2b and 2c are schematic diagrams of alternate hydraulic circuits of the water craft.
Figure 2B:
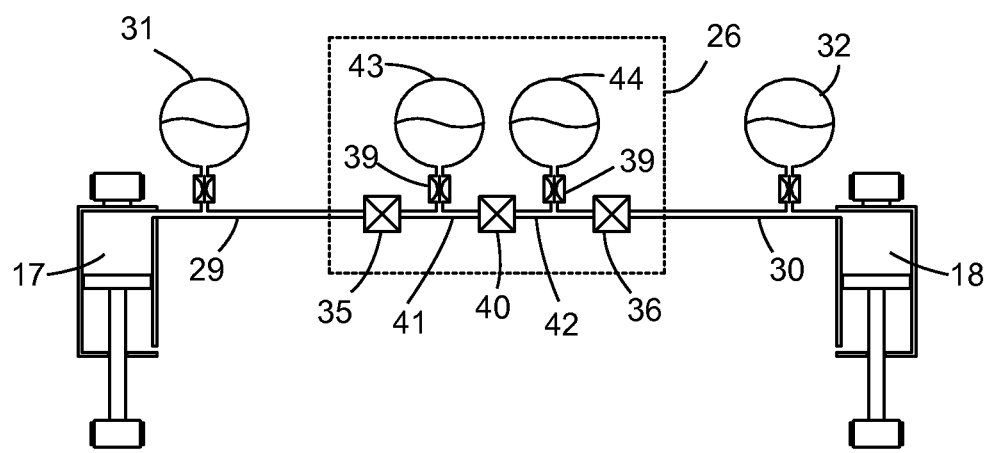
Figure 2C:
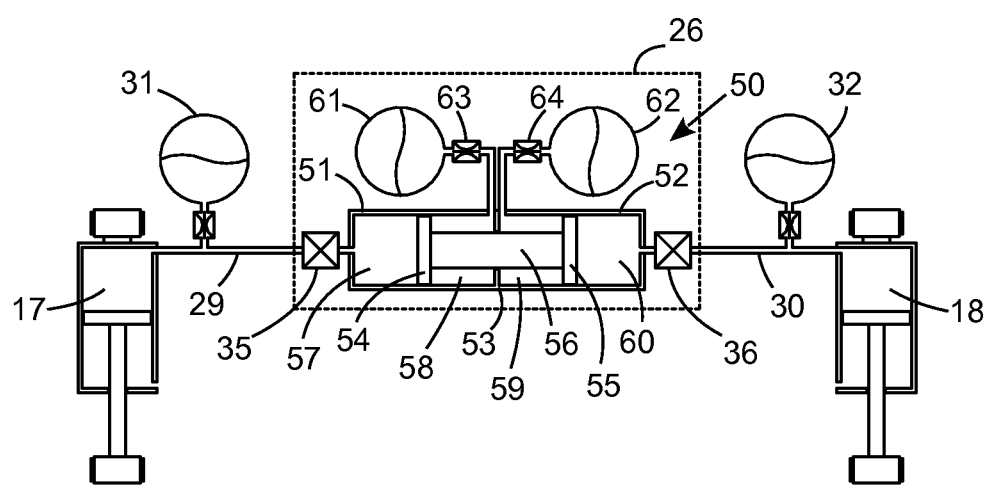

Alternative embodiments of the body pitch device 26 are shown in FIGS. 2a, 2b and 2c. In FIG. 2a, two valves are shown, a front body pitch valve 35 and a back body pitch valve 36, although each valve can be a single valve or a combination of valves such as a lock-out valve and/or a variable restriction and a damper. The body pitch device 26 also encompasses a body pitch conduit mid portion 37 between the two valves (35, 36) in the pitch device, into which a fluid pressure accumulator is connected via a damper valve 39. The accumulator can be used to absorb fluid pressure/volume generated by either the front or back pitch support rams, to permit the capture and selective release of energy (from for example pitch inputs caused by a wave). This permits at least some of the flow of fluid between front and rear to be delayed, or even stored and sent back to the ram which generated the increased fluid pressure. The damper valve 39 can be omitted, or it can be variable, or a lockout valve, or a combination as discussed for the other two valves 35, 36 in the device. The control is similar to that for FIG. 1, but preferably includes the addition of an input for the pressure in the accumulator 38.

The alternative embodiment of the body pitch device 26 shown in FIG. 2b includes, a front body pitch valve 35 and a back body pitch valve 36 are included in the pitch device, but with the addition of a mid-body pitch valve 40. The body pitch device now encompasses: a body pitch conduit front-mid portion 41 between the front body pitch valve 35 and the mid body pitch valve 40; and a body pitch conduit back-mid portion 42 between the back body pitch valve 36 and the mid body pitch valve 40. On each of the body pitch conduit front- and back-mid portions (41, 42) is a respective fluid pressure accumulator 43, 44. The fluid communication between each accumulator 43, 44 and its respective conduit portion 43, 44 can be direct, or can optionally include one or more valves such as the damper valve (45) illustrated.

The further alternative embodiment of the body pitch device 26 shown in FIG. 2c includes a body pitch displacement device 50. Unlike in the previous Figures, the body pitch device now provides one or more pistons blocking the body pitch conduit 25, displacement of the piston(s) allowing the front and back pitch compression volumes to change in volume by effectively transferring fluid between the two volumes. In the example shown in FIG. 2c, the body pitch displacement device 50 comprises two axially aligned cylinders 51, 52 separated by a wall 53. A front piston 54 divides the front cylinder 51 into a front pitch volume chamber 57 and a front pitch modal resilience chamber 58. Similarly a back piston 55 divides the back cylinder 52 into a back pitch volume chamber 60 and a back pitch modal resilience chamber 59. Respective front and back pitch modal resilience accumulators 61, 62 are connected to the respective front and back pitch modal resilience chambers 58, 59 via damper valves 63, 64. The front and back pitch modal resilience damper valves 63, 64 are optional as their function may be performed by the front and back body pitch valves 35, 36, which are also optional. While the body pitch device of FIG. 2c controls the effective flow of fluid (rather than the direct transfer of fluid) between the front and back portions of the body pitch conduit, it can do so using primarily resilience where in the previous embodiments in FIGS. 1 to 2b, the fluid flow was primarily controlled using switched or variable valves. Hence in the body pitch device of FIG. 2c, any or all of the valves 35, 36, 63 and 64 are optional, although it is preferable to include at least one such valve for improved performance of the system. Also, as the effective (i.e. the actual fluid in the front conduit does not enter the back conduit) transfer of fluid between the front and back portions of the pitch conduit now has to work against a spring, providing a pitch stiffness, the separate support means as discussed in FIG. 1 are no longer required when the pitch device of FIG. 2c is used the water craft layout of FIG. 1 (at least not just to provide a pitch stiffness).

Figure 3:
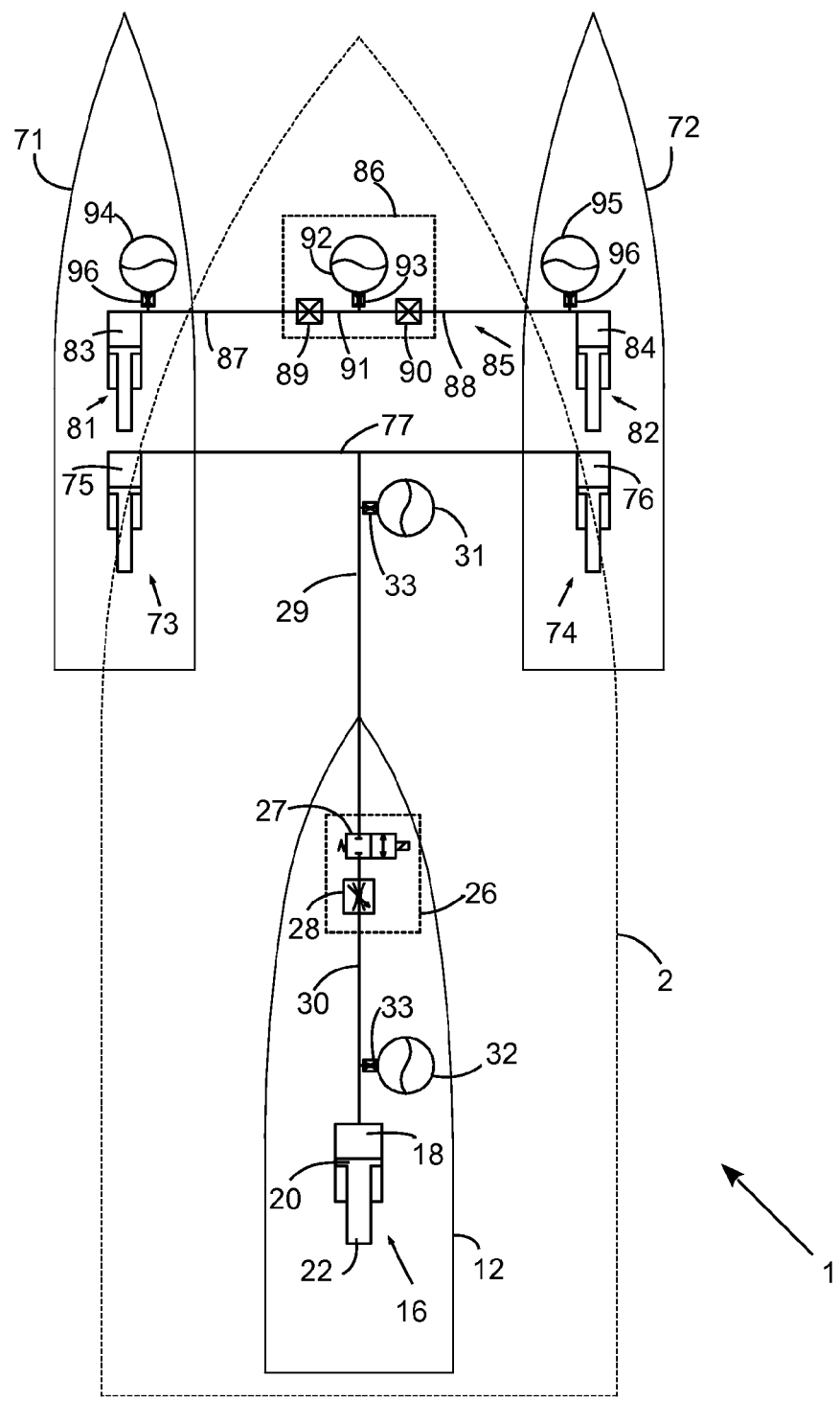
FIG. 3 is a diagrammatic plan view of a water craft in accordance with an alternative embodiment of the present invention having 3 water engaging means.

To improve the roll stability of the water craft shown in FIG. 1, the front or rear pod can be replaced by a laterally spaced pair of pods. In FIG. 3, the front pod has been replaced by a front left pod 71 and a front right pod 72 and equivalent components have been given the same reference numeral. There is both a front pitch support ram and a roll ram on each front pod. Each of the front left and front right pitch support rams 73, 74 includes a respective compression chamber 75, 76. The back pitch support ram 16 has a different diameter to the front pitch support rams. The use of different diameter rams can be used to adjust the balance between front and back ram forces as required by the fore/aft center of mass position profile of the water craft or to adjust the pitch response of the water craft as desired. The front left pitch support ram compression chamber 75 and the front right pitch support ram compression chamber 76 are interconnected by a front pitch compression conduit 77. Together the two chambers 75, 76 and interconnecting conduit 77 are equivalent to the front pitch support ram compression chamber in FIGS. 1 to 3 and are connected to the body pitch conduit front portion 29 to form the front pitch compression volume. Again resilience can be provided by the front fluid pressure accumulator 31, connected to the front pitch compression volume. More than one accumulator can be provided (i.e. one can be provided on or near each pitch support ram) and each can optionally be connected to the front pitch compression volume by a valve to provide some form of flow control such as damping or lock-off.

Figure 4:
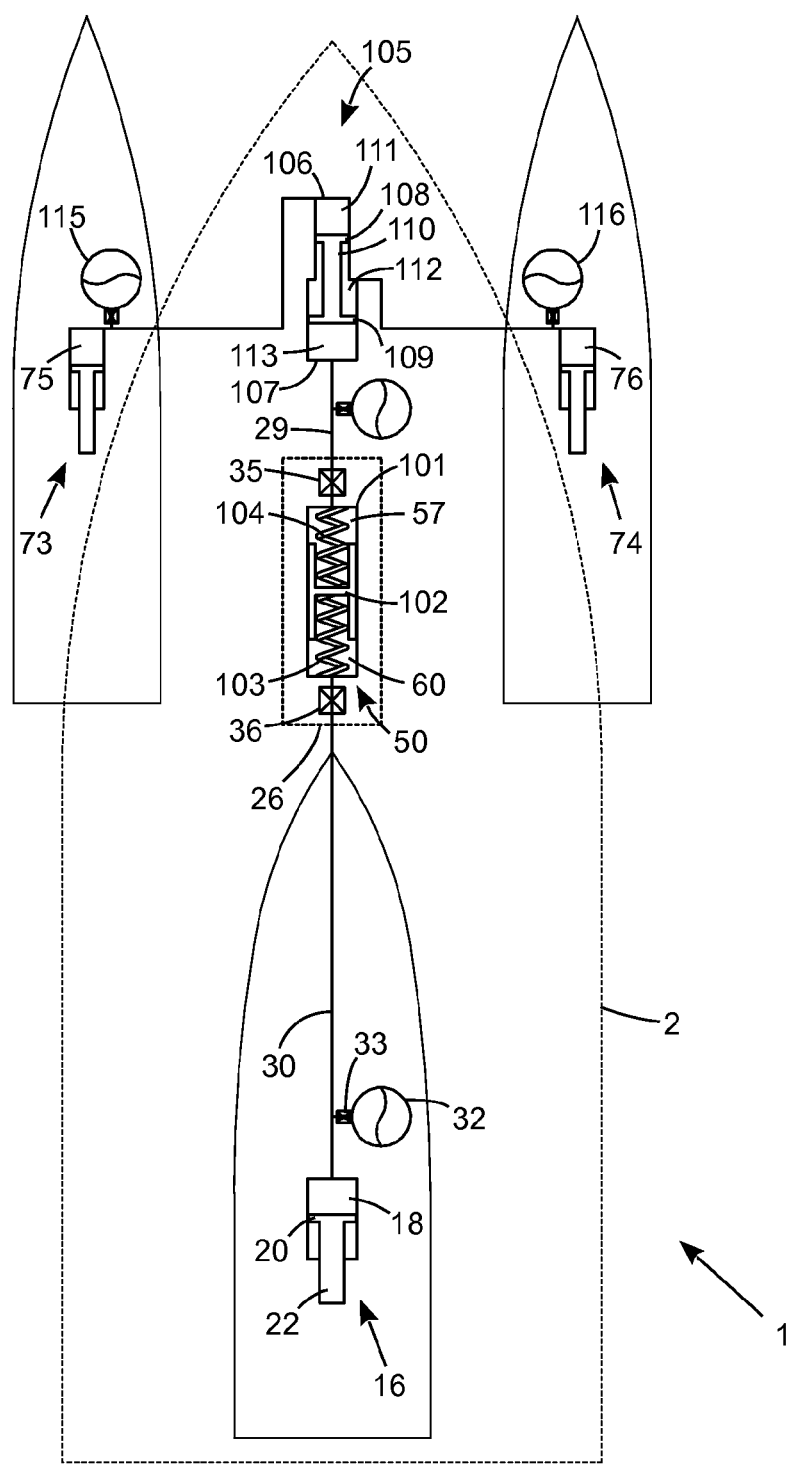
FIG. 4 is a diagrammatic plan view of a water craft in accordance with a further alternative embodiment of the present invention.

The front left and front right roll rams 81, 82 each include a compression chamber 83, 84. If as shown in FIG. 4 they are of a construction that provides a push out force, then they also provide support for a portion of the load on the front of the body (in addition to the front pitch support rams). The front left roll ram compression chamber 83 is connected to the front right roll ram compression chamber 84 by a body roll conduit 85. A body roll device 86 divides the body roll conduit into a left portion 87 and a right portion 88, the body roll device shown being similar to the body pitch device 26 in FIG. 2, having a left body roll valve 89 and a right body roll valve 90 either end of a body roll conduit mid portion 91. Similarly a fluid pressure accumulator 92 is also included, connected to the roll conduit mid portion 91 through an optional damper valve 93. The body roll conduit left portion 87 together with the front left roll ram compression chamber 83 forming a left roll compression volume and the body roll conduit right portion 88 together with the front right roll ram compression chamber 84 forming a right roll compression volume. An optional left roll accumulator 94 is shown connected to the left roll compression volume and a right roll accumulator 95 is shown connected to the right roll compression volume, each connection including an optional damper valve 96.

The arrangement of the body roll system (comprising the roll rams, conduits, body roll device and other components with reference numerals between 81 and 96) described above is similar to the pitch system shown in FIG. 2a, transposed through ninety degrees in plan view and can be operated in a similar manner to provide roll support and permit selective capture and transfer of fluid pressure between the roll rams with the aim of minimizing or at least reducing roll accelerations of the body compared to the change in roll attitude of the water surface. The body roll device 86 can be modified to be similar to that for pitch in FIG. 1, 2b or 2c.

FIG. 4 shows a similar trimaran configuration to FIG. 3. However, in FIG. 4, the body pitch device 26 has been replaced with a sprung piston type pitch displacement device 50 having similar functionality to that shown in FIG. 2c. In FIG. 4 the resilience is mechanical, provided by resilient members 103, 104 which bias the piston 102 in the cylinder 101. The resilience can be damped, or selectively held and released as previously discussed using the front and back body pitch valves 35 and 36.

The body pitch conduit front portion 29 is not in direct fluid communication with the compression chambers 75, 76 of the front left and front right pitch support rams 73, 74. As directly interconnecting the compression chambers of the front left and front right pitch support rams removes the roll stiffness which would be provided if they were left independent, a similar-motion device 105 is provided between the compression chambers of the front left and front right pitch support rams. The similar motion device 105 includes two cylinders 106, 107 each housing a piston 108, 109 joined by a rod 110. As the piston rod assembly (108, 109, 110) slides axially in the cylinders, the front left support chamber 111 and the front right support chamber 112 both vary in volume in the same direction or sense and in the opposite direction to the front compression chamber 113. The similar-motion device 105 essentially displaces when both attached rams displace in the same direction, for example in pitch or heave, so the similar-motion device 105 can be known as a heave device.

In FIG. 4, when both front pitch support rams 73 and 74 compress, the piston rod assembly (108, 109, 110) displaces as fluid enters the front left and right support chambers 111, 112 which in turn displaces fluid out of the front compression chamber 113, through the body pitch conduit front portion 29 and into the front pitch volume chamber 57 of the pitch displacement device 50. Conversely in roll, when the front left and right rams are displacing in opposite directions, one extending as one contracts, the increase in pressure in one of the front left or right support chambers is reacted in the similar motion device 105 by the decrease in pressure in the other front left or right support chamber. The results in substantially no motion of the piston rod assembly (108, 109, 110), i.e. a roll input has little or no effect on pitch, but the dissimilar motions of the left and right rams 73, 74 are not accommodated by the similar-motion device 105 and the accumulators 115 and 116 determine the roll stiffness of the hydraulic system shown.

The body roll system shown in FIG. 3 has the same stiffness for vertical displacements of the front pods in roll and in heave. Alternatively a body roll system as shown in FIG. 5 can be used which decouples the roll stiffness from the heave stiffness provided by the roll system through the use of double acting roll rams.

Figure 5:
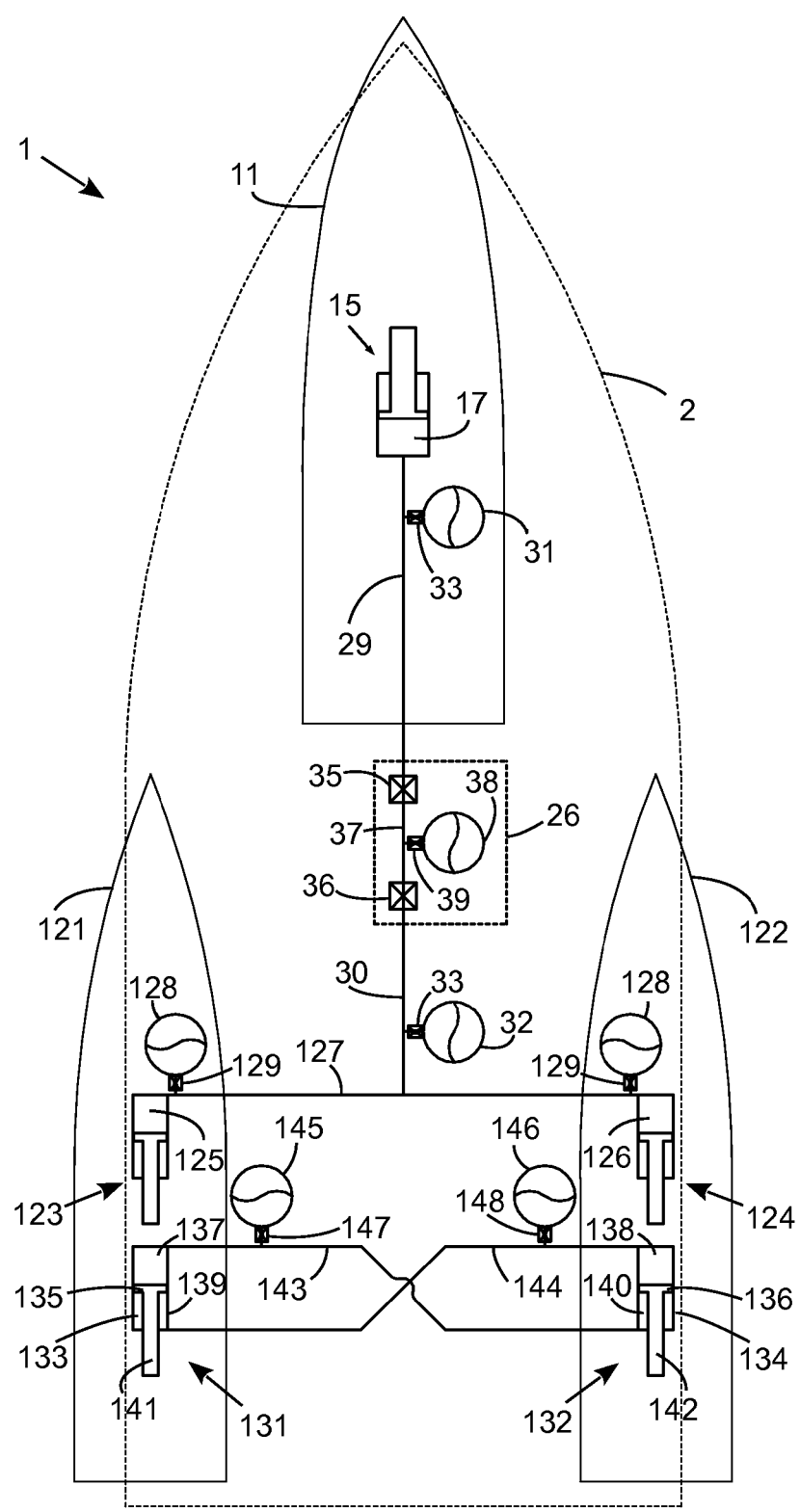
FIG. 5 is a diagrammatic plan view of a water craft in accordance with a further alternative embodiment of the present invention.

In FIG. 5, a single front pod 11 is shown similar to FIG. 1 but with two back pods. The back left pod 121 has a back left pitch support ram 123 and a back left roll ram 131, and the back right pod 122 has a back right pitch support ram 124 and a back right roll ram 132.

The back left pitch support ram compression chamber 125 and the back right pitch support ram compression chamber 126 are interconnected by a back pitch compression conduit 127. Together the two chambers 125, 126 and interconnecting conduit 127 are equivalent to the back pitch support ram compression chamber in FIGS. 1 to 3 and are connected to the body pitch conduit back portion 30 to form the back pitch compression volume. Again resilience can be provided by the back fluid pressure accumulator 31, connected to the back pitch compression volume. Additional (optional) back pitch support accumulators 128, 129 are shown connected to the interconnecting conduit 127 adjacent to each back pitch support ram 123, 124. Each accumulator is provided with an optional damper (or other flow control valve) 130 to permit control of the flow of fluid between the accumulator and the back pitch compression volume. The body pitch device 26 shown is the same as the version shown in FIG. 2a although other versions such as those shown in FIG. 1, 2b or 2c can be substituted.

The double-acting back left roll ram 131 has its cylinder 133 divided by a piston 135 into a compression chamber 137 and a rebound chamber 139. As with most double-acting rams a rod 141 is attached to the piston and extends through only the rebound chamber. This provides unequal piston areas in compression and rebound, which generally gives a static push-out force (for example, when both chambers have the same pressure, the push out force is determined by that pressure and the cross-sectional area of the rod). Similarly, the double acting back right roll ram 132 has its cylinder 134 divided by a piston 136 into a compression chamber 138 and a rebound chamber 140 through which the rod 142 extends. The back left roll ram compression chamber 137 is connected to the back right roll ram rebound chamber 140 by a back left roll compression conduit 143 forming a back left roll compression volume and the back right roll ram compression chamber 138 is connected to the back left roll ram rebound chamber 139 by a back right roll compression conduit 144 forming a back right roll compression volume. If the roll compression volumes are filled with hydraulic fluid then preferably resilience is added by a left roll accumulator 145 (shown connected to the back left roll compression volume through an optional damper valve 147) and a right roll accumulator 146 (shown connected to the back right roll compression volume through an optional damper valve 148).

The two roll compression volumes form a roll circuit which inherently (and therefore passively) provides a higher roll stiffness than heave stiffness, the ratio being determined by a function of the rod and cylinder diameters. For example with differential (roll) motion of the left and right roll rams 131, 132, say 50 mm compression of the left roll ram and 50 mm extension of the right roll ram, then fluid is displaced from the compression chamber 137 of the left roll ram and from the rebound chamber 140 of the right roll ram into the left roll compression conduit 143 and absorbed into the left roll accumulator 145. However, similar (heave) motion of the left and right roll rams displaces fluid out of the left roll ram compression chamber 137 and into the right roll ram rebound chamber 140, leaving only the difference in displaced volumes (due to the difference in piston face areas caused by the rod in the rebound chamber) to be absorbed by the left roll accumulator 145. If a "through rod" is used then there is no difference between the displaced volumes to be absorbed by the accumulator in heave and therefore no stiffness.

The use of a roll system with little or substantially zero heave stiffness can be advantageous in layouts where the roll system acts towards one end of the body away from the center of mass, else the additional heave stiffness can compromise the operation of the pitch system.

Figure 6:
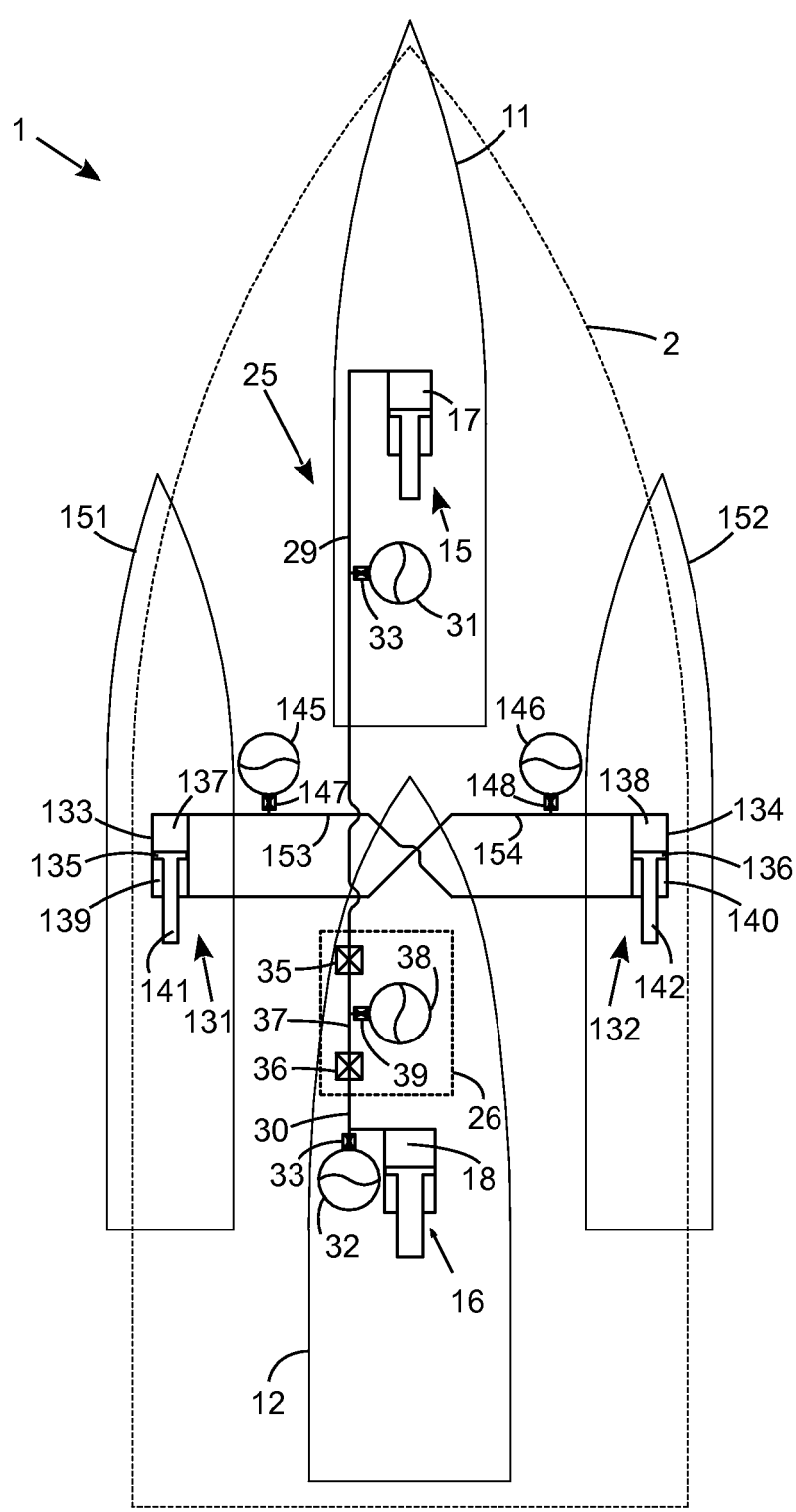
FIG. 6 is a diagrammatic plan view of a water craft in accordance with a further alternative embodiment of the present invention having four water engaging means in a diamond configuration.

Another alternative is to use a water craft having four pods arranged in a diamond configuration in plan view as shown in FIG. 6. In this case the pitch device shown is the same as in FIG. 2a, although other body pitch device versions such as those from FIG. 1, 2b, 2c or 4 are also applicable. The roll system from the laterally spaced back pods of FIG. 5 is shown although the roll system from the laterally spaced front pods from FIG. 4 could also be used. The pitch system and roll system could share the support of the body 2, but there are many considerations and options. For example, the laterally spaced left pod 151 and right pod 152 could be designed to carry the majority of the load of the water craft with the front and back pods (11, 12) mainly providing additional control of the pitch attitude of the body. Alternatively (and as illustrated) the front and back pods (11, 12) can provide the majority of the support for the body 2 of the water craft with the lateral pods (151, 152) primarily providing roll stability. In a hydropneumatic system (i.e. if the fluid is hydraulic and the resilience pneumatic) the stiffness of the suspension system (the roll and pitch systems) increases with load, as does the natural frequency. If the systems are entirely pneumatic, the stiffness increases with load but the natural frequency is substantially constant. This characteristic of varying stiffness with varying load means that if the water craft has a large load variation and most or all of the support is provided by say the pitch system, then the pitch stiffness will increase with load but the roll stiffness will not. The pressure in the roll and pitch systems can be individually controlled (by design or using a fluid pressure control system) to adjust the balance between roll and pitch stiffness.

The left and right pods have only a roll ram providing force to support the body above the pods. The left pod 151 has a left roll ram 131 and the right pod 152 has a right roll ram 132 which are substantially equivalent to the back left roll ram 131 and back right roll ram 132 in FIG. 5. The left and right roll rams are laterally cross-connected (compression chamber 137, 138 to rebound chamber 140, 139) by left and right roll compression conduits 153, 154 forming left and right roll compression volumes which operate substantially as described for FIG. 5.

The left and right pods 151, 152 shown are also asymmetric which can provide advantages particularly in lift and steering.

Figure 7:
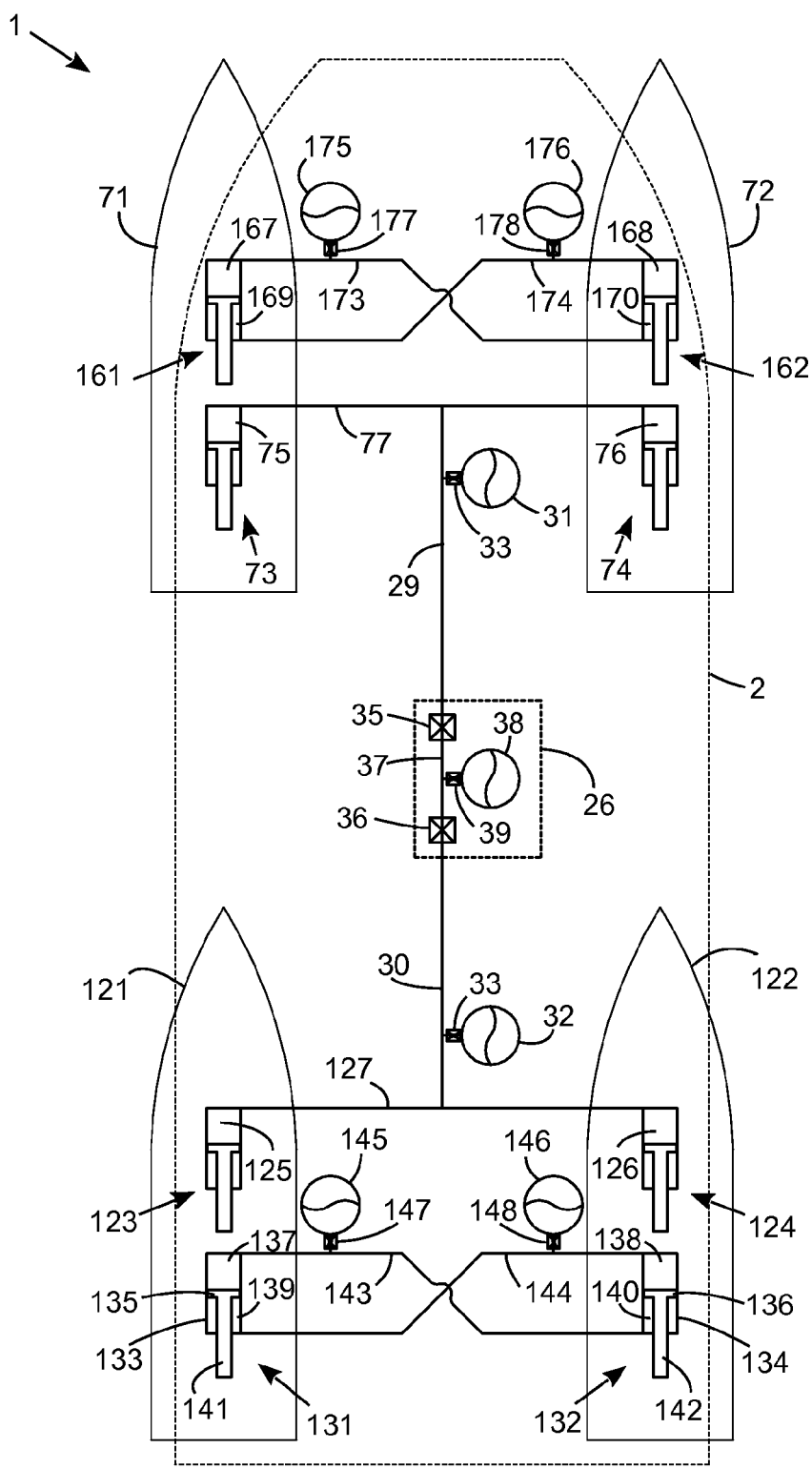
FIG. 7 is a diagrammatic plan view of a water craft in accordance with a further alternative embodiment of the present invention having four water engaging means in a rectangular configuration.

FIG. 7 shows a water craft with a rectangular configuration of four pods. The front pair of laterally spaced pods 71, 72 are similar to those in FIG. 3, each pod having both a pitch support ram 73, 74 and a roll ram 161, 162. However unlike FIG. 4, the front left roll ram 161 and the front right roll ram 162 are double acting. The back pair of laterally spaced pods are similar to those in FIG. 5, each pod having both a pitch support ram 123, 124 and a double-acting roll ram 131, 132.

As in FIG. 3, the lateral interconnecting conduit 77 between the front left and front right pitch support ram compression chambers 75, 76 enables the front left and front right rams to contribute towards a common front pitch compression volume. Also as in FIG. 5, the lateral interconnecting conduit 127 between the back left and back right pitch support ram compression chambers 125, 126 enables the formation of a single back pitch compression volume. These lateral interconnections ensure that each pitch support ram provides substantially no roll stiffness, while permitting the pitch system to operate in a manner substantially the same as discussed for FIG. 2a (which shows the same version of the pitch device 26). The alternative pitch devices such as those from FIGS. 1, 2b, 2c and 4 can be substituted.

The roll system from the pair of laterally spaced back pods in FIG. 5 is applied independently to the front and back pairs of laterally spaced pods in FIG. 7. The front left roll ram compression chamber 167 is connected to the front right roll ram rebound chamber 170 by a front left roll compression conduit 173 forming a front left roll compression volume and the front right roll ram compression chamber 168 is connected to the front left roll ram rebound chamber 169 by a front right roll compression conduit 174 forming a front right roll compression volume. Left and right roll accumulators 175, 176 are shown connected to the front left and front right roll compression volumes through optional damper valves 177, 178.

However, using independent roll systems front and back provides a warp stiffness to the suspension of the water craft, and a degree of warp stiffness can be beneficial in some craft configurations in some conditions. The front and back roll systems can be actively controlled (using a pump, tank, conduits and valves to control the volume of fluid in each of the front left, front right, back left and back right roll compression volumes) which can provide control of roll attitude, roll stiffness and warp loads. Alternatively a body roll device as discussed in FIG. 3 can be connected between the front left and front right roll compression volumes and/or a body roll device can be connected between the back left and back right roll compression volumes to enable control of flow (or at least effective flow if using a displacement type roll device) between a left and right roll compression volume to reduce warp loads and to reduce roll accelerations on the body.

Figure 8:
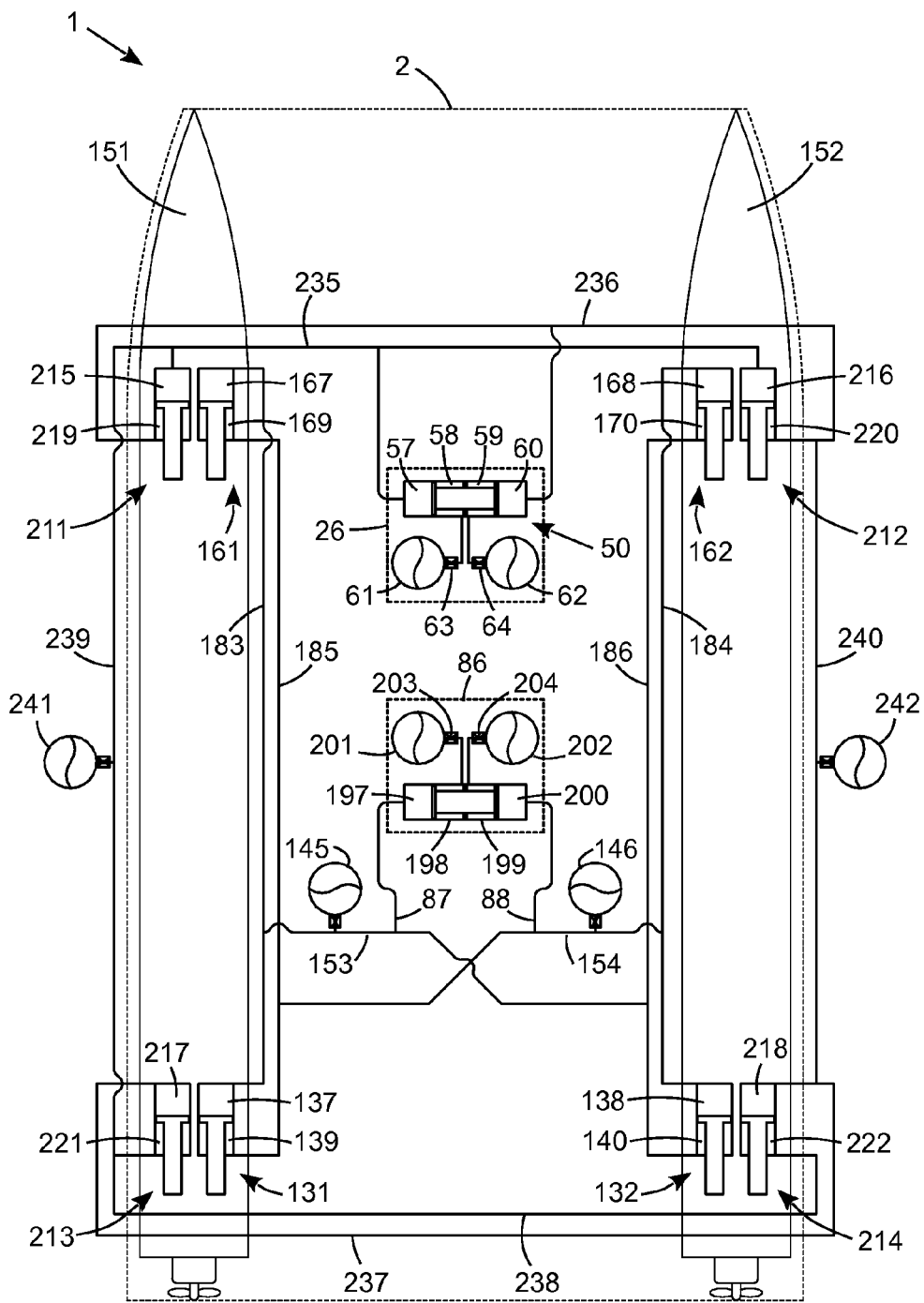
FIG. 8 is a diagrammatic plan view of a water craft in accordance with a further alternative embodiment of the present invention having two laterally spaced water engaging means and shows pitch and roll systems.

FIG. 8 shows a water craft having a left pod 151 and a right pod 152, i.e. a catamaran. As there are only two laterally spaced pods supporting the body portion of the water craft, support means need to be provided at longitudinally spaced positions on each side pod to provide pitch support and stiffness of the body relative to the pods. One possible method of providing a suitable suspension is shown in FIG. 8 where pairs of longitudinally spaced, double-acting roll and pitch rams are provided.

The compression chambers 167, 137 of the left roll rams 161, 131 are interconnected by a left roll compression conduit 183 and the rebound chambers 169, 139 of the left roll rams are connected by a left roll rebound conduit 185. The compression chambers 168, 138 of the right roll rams 162, 132 are interconnected by a right roll compression conduit 184 and the rebound chambers 170, 140 of the right roll rams are connected by a right roll rebound conduit 186. The left roll compression conduit 183 is connected to the right roll rebound conduit 186 by a conduit 153 to form a left roll compression volume. Similarly, the right roll compression conduit 184 is connected to the left roll rebound conduit 185 by a conduit 154 to form a right roll compression volume. The arrangement of the left and right roll compression volumes (which can be referred to as a roll circuit) provides the roll rams with a zero warp stiffness and a higher roll stiffness than heave stiffness. The high roll stiffness can be reduced by using a roll device 86, which can be of a switching or stiffness type, or both as shown, or the roll accelerations could be controlled using an active control of the roll circuit or of a roll displacement device. If as shown, the roll device 86 includes a roll displacement device 190 (that shown has similar construction to the pitch device of FIG. 2c, although many other variations such as the construction of pitch device in FIG. 4 for example) it can add a known resilience into the roll circuit (and/or be used to actively control the body roll attitude when an active control arrangement is provided including a fluid pressure source, not shown). No valves are shown in the body roll conduit left and right portions (87, 88) connecting the left and right roll volume chambers 197, 200 of the roll displacement device to the respective conduits 153, 154 of the roll circuit left and right roll compression volumes, although valves can be provided, for example to switch between a high and a low roll stiffness setting of the roll circuit. Alternatively, if respective left and right roll modal resilience damper valves 203, 204 are provided in the connections between the respective roll modal resilience accumulators 201, 202 and the respective roll modal resilience chambers 198, 199, the damper valves 203, 204 can be controllable to restrict fluid flow and prevent the roll device from permitting effective fluid flow between the body roll conduit left and right portions.

The pitch support rams 211, 212, 213, 214 are connected in a pitch circuit of similar connectivity and functionality to the roll circuit transposed through ninety degrees in plan view. The front left and front right pitch support ram compression chambers 215, 216 are connected by the front pitch compression conduit 235. The front left and front right pitch support ram rebound chambers 219, 220 are connected by the front pitch rebound conduit 236. The back left and back right pitch support ram compression chambers 217, 218 are connected by the back pitch compression conduit 237. The back left and back right pitch support ram rebound chambers 221, 222 are connected by the back pitch rebound conduit 239. The front pitch compression conduit 235 is connected to the back pitch rebound conduit 238 by the forward pitch conduit 239, the connected ram chambers (and any arrangement of conduits to interconnected those chambers) forming a front pitch (compression) volume. Similarly, the back pitch compression conduit 237 is connected to the front pitch rebound conduit 236 by the forward pitch conduit 240, the connected ram chambers (and any arrangement of conduits to interconnected those chambers) forming a back pitch (compression) volume. The front and back pitch accumulators 241, 242 provide resilience in the hydraulic circuits. The arrangement provides a higher pitch stiffness than heave stiffness from the pitch support rams and zero warp stiffness.

As with the roll circuit, the high (in this case pitch) stiffness of the pitch circuit can be reduced as required or designed by the provision of a body pitch device 26, which in the example in FIG. 8 is shown as a pitch displacement device 50 of the form shown and described in relation to FIG. 2c. Although no valves are shown in the body pitch conduit front and back portions (29, 30) connecting the front and back pitch volume chambers 57, 60 of the pitch displacement device to the pitch circuit front and back pitch compression volumes, they can optionally be provided, and/or the front and back pitch modal resilience damper valves 63, 64 can be controlled to restrict fluid flow and prevent the pitch device from permitting effective fluid flow between the body pitch conduit front and back portions 29, 30.

Figure 9:
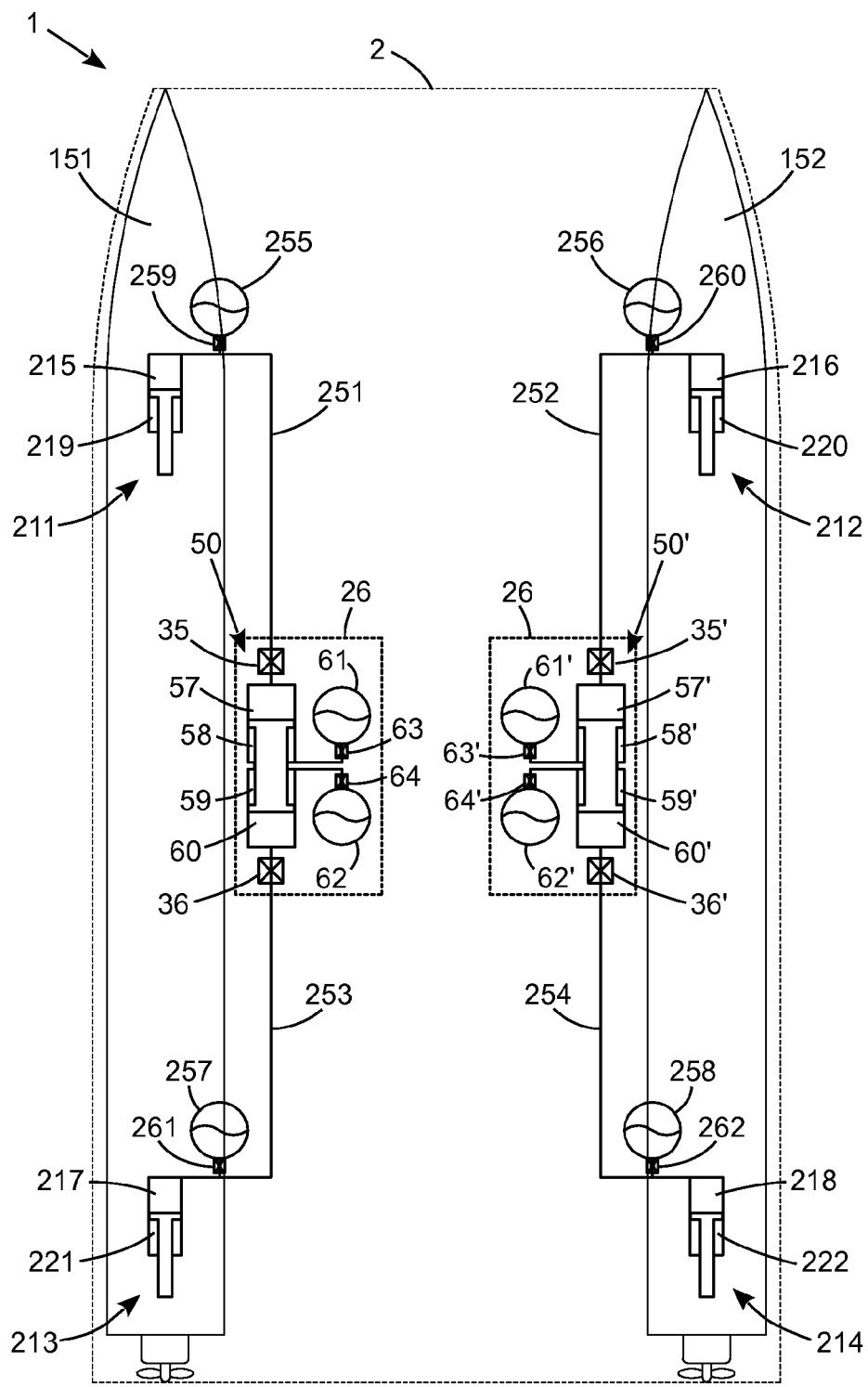
FIG. 9 is a diagrammatic plan view of a water craft incorporating two pitch circuits according to the present invention.

The catamaran shown in FIG. 9 has a much simpler suspension system which provides control of the pitch stiffness of each hull relative to the body. A pitch device 26 is used between the front and back left pitch support rams 211, 213 and another pitch device 26' is used between the front and back right pitch support rams 212, 214. It is effectively two versions of the ram arrangement from FIG. 1, each using a pitch displacement device (50) version of the pitch device. It has a warp stiffness related the pitch stiffness and it has a roll stiffness related to the heave stiffness. The front left pitch support ram compression chamber 215 is connected by a front left pitch compression conduit 251 to the front pitch volume chamber 57 of the pitch displacement device 50 via the optional valve 35. The back left pitch support ram compression chamber 217 is connected by a back left pitch compression conduit 253 to the back pitch volume chamber 60 of the pitch displacement device 50. Similarly, the front right pitch support ram compression chamber 216 is connected by a front right pitch compression conduit 252 to the front pitch volume chamber 57' of the pitch displacement device 50' and the back right pitch support ram compression chamber 218 is connected by a back right pitch compression conduit 254 to the back pitch volume chamber 60' of the pitch displacement device 50'. Respective front left, front right, back left and back right (pitch compression) accumulators 255, 256, 257, 258 are provided in fluid communication with the respective pitch (support ram) compression chambers (215, 216, 217, 218), for example being connected via respective damper valves 259, 260, 261, 262 to the respective pitch compression conduits 251, 252, 253, 254 as shown.

It should be noted that for a catamaran such as shown in FIGS. 8 and 9, the (or a) roll circuit could be provided by a single ram on each side pod, the left and right roll rams being located between the respective front and back pitch support rams. The left and right roll rams can then be interconnected as the roll rams 81 and 82 in FIG. 3, or 131, 132 in FIG. 6 (or even as the front left and front right pitch support rams in FIG. 4, connected to a similar-motion device which provides heave rather than pitch support, with a higher roll stiffness than heave stiffness). These arrangements can further improve distribution of loads into the side hulls, especially when the roll rams are positioned approximately about the longitudinal center of buoyancy and would improve the functionality of the simple suspension system shown in FIG. 9.

Alternatively, the warp stiffness of the suspension system shown in FIG. 9 can be removed by interconnecting the front pitch modal resilience chambers 58 and 58' of the pitch displacement devices 50 and 50' using a front pitch modal resilience conduit 65, and by interconnecting the back pitch modal resilience chambers 59 and 59' using a back pitch modal resilience conduit 66. In this case a common front pitch modal resilience accumulator 61 and damper valve 63 can be used and a common back pitch modal resilience accumulator 62 and damper valve 64 can be used.

Figure 10:
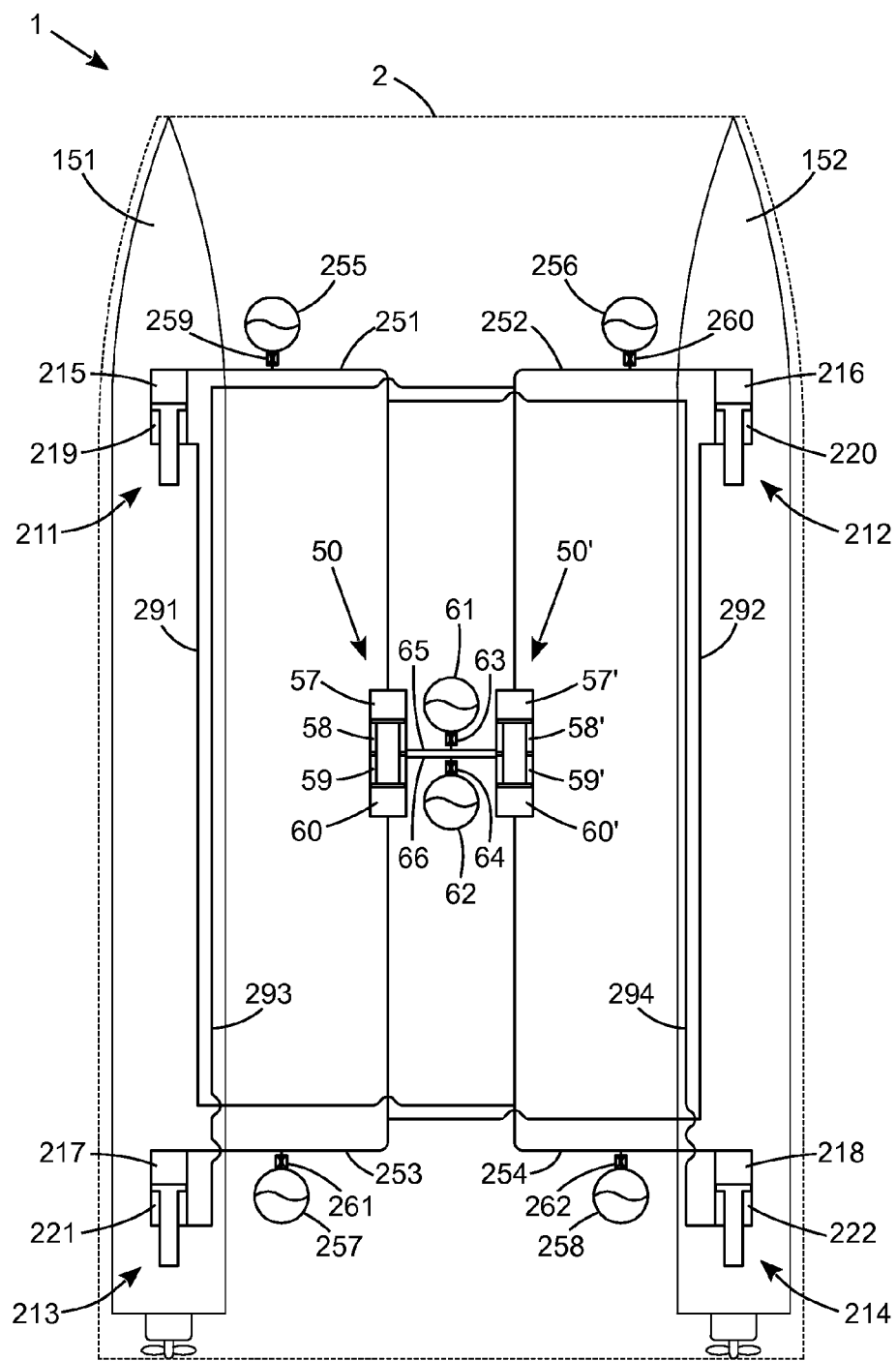
FIG. 10 is a diagrammatic plan view of a water craft in accordance with a further alternative embodiment of the present invention showing the pitch systems interconnected.

Additionally (as also shown in FIG. 10) or alternatively, the roll stiffness can be increased relative to the heave stiffness by interconnecting each pitch support ram compression chamber to the rebound chamber of the diagonally opposite ram. To this end, the front left pitch compression conduit 251 is connected to the back right pitch support ram rebound chamber 222 by a back right pitch rebound conduit 294. The front right pitch compression conduit 252 is connected to the back left pitch support ram rebound chamber 221 by a back left pitch rebound conduit 293. The back left pitch compression conduit 253 is connected to the front right pitch support ram rebound chamber 220 by a front right pitch rebound conduit 292. The back right pitch compression conduit 254 is connected to the front left pitch support ram rebound chamber 219 by a front left pitch rebound conduit 291.

Figure 11:
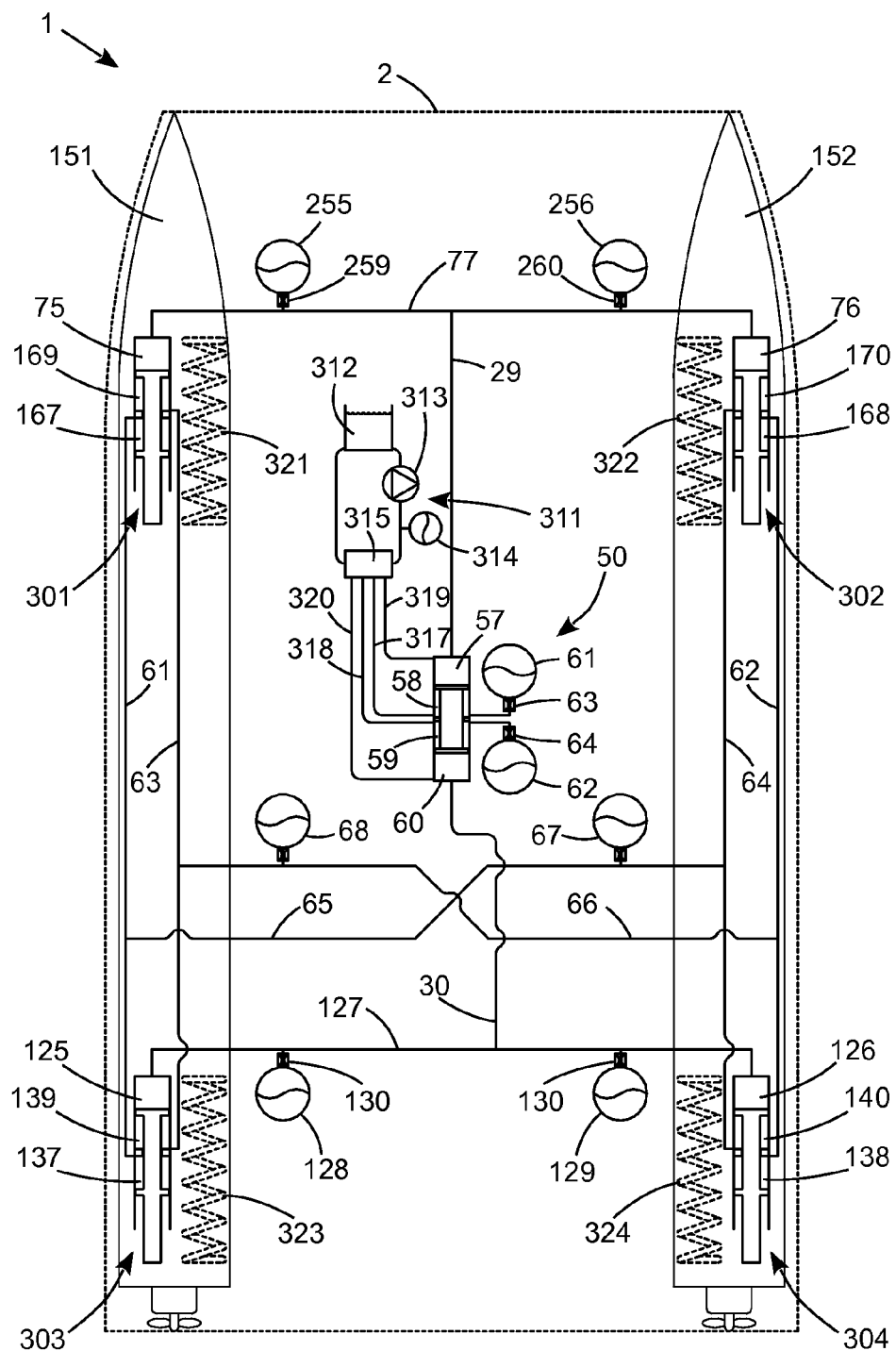
FIG. 11 is a diagrammatic plan view of a water craft in accordance with a further alternative embodiment of the present invention incorporating control of the pitch system.

In FIG. 11, the respective pitch support ram compression chambers of the single-acting pitch support rams from FIG. 7 are integrated into respective triple-chamber rams 301, 302, 303, 304 along with the respective roll ram compression and rebound chambers of the roll circuit from FIG. 8. The front left triple-chamber ram 301 includes a front left pitch support compression chamber 75, a front left roll compression chamber 167 and a front left roll rebound chamber 169. The front right triple-chamber ram 302 includes a front right pitch support compression chamber 76, a front right roll compression chamber 168 and a front right roll rebound chamber 170. The back left triple-chamber ram 303 includes a back left pitch support compression chamber 125, a back left roll compression chamber 137 and a back left roll rebound chamber 139. The back right triple-chamber ram 304 includes a back right pitch support compression chamber 126, a back right roll compression chamber 138 and a back right roll rebound chamber 140.

In the design of each triple-chamber ram shown (301, 302, 303, 304), the roll compression chamber has the same effective piston area as the roll rebound chamber, so the roll circuit will no longer provide any heave stiffness, although the remainder of the function of the roll circuit from FIG. 8 remains, including providing roll stiffness without providing any warp stiffness. The roll displacement device from FIG. 8 is not shown but may be used, as may active control of the roll circuit to readily provide control of the roll attitude of the body (2).

The pitch compression chambers are interconnected as in FIG. 7, but the pitch device 26 shown in FIG. 11 is the pitch displacement device 50 from FIG. 2c. As is known to one skilled in the art, the arrangement of two pairs of chambers which vary in opposite directions with motion of a piston rod assembly can be achieved using other designs such as three cylinders, three pistons and one rod, or three cylinders, one piston and two rods, so the construction of a pitch displacement device using pitch modal resilience chambers should not be limited to the design shown in the accompanying figures. Additionally, as is the case for any use of a pitch displacement device having pitch modal resilience chambers, those chambers (58, 58) can be connected to the control conduits of an active control system (whether the modal resilience accumulators 61, 62 are retained or not) to enable active control of the pitch attitude of the body (2). To this end, a fluid pressure control system 311 is shown in which a pump 313 charges a supply accumulator 314 (optional, but improves control response for a given size pump) with fluid from the reservoir 312. The active control system actuates valves in the valve manifold 315 to supply pressurized fluid (from the pump and supply accumulator) to, or release fluid (into the reservoir 312) from the modal resilience volumes of the pitch displacement device 50. It is not essential that the modal resilience volumes include resilience for this active control. In fact resilience will introduce a phase lag from the control input to the body response due to the pitch resilience, so damping or removing the pitch resilience can reduce the phase lag of the active pitch control. If the pitch resilience accumulators 61, 62 are removed, the front and back pitch modal resilience chambers 58, 59 of the pitch displacement device 50 may be more appropriately renamed front and back pitch control chambers. Front and back pitch control conduits 317, 318 are shown connecting the valve manifold 315 to the front and back pitch control chambers 58, 59 to enable such control. The fluid pressure control system 311 can also be used to provide a fluid volume maintenance function by supplying or releasing fluid into or out of the front and back pitch control chambers 58, 59 using conduits 317, 318. Similarly front and back supply conduits 319, 320 can be provided to maintain the volume of fluid in the front and back pitch compression volumes.

Figure 12:
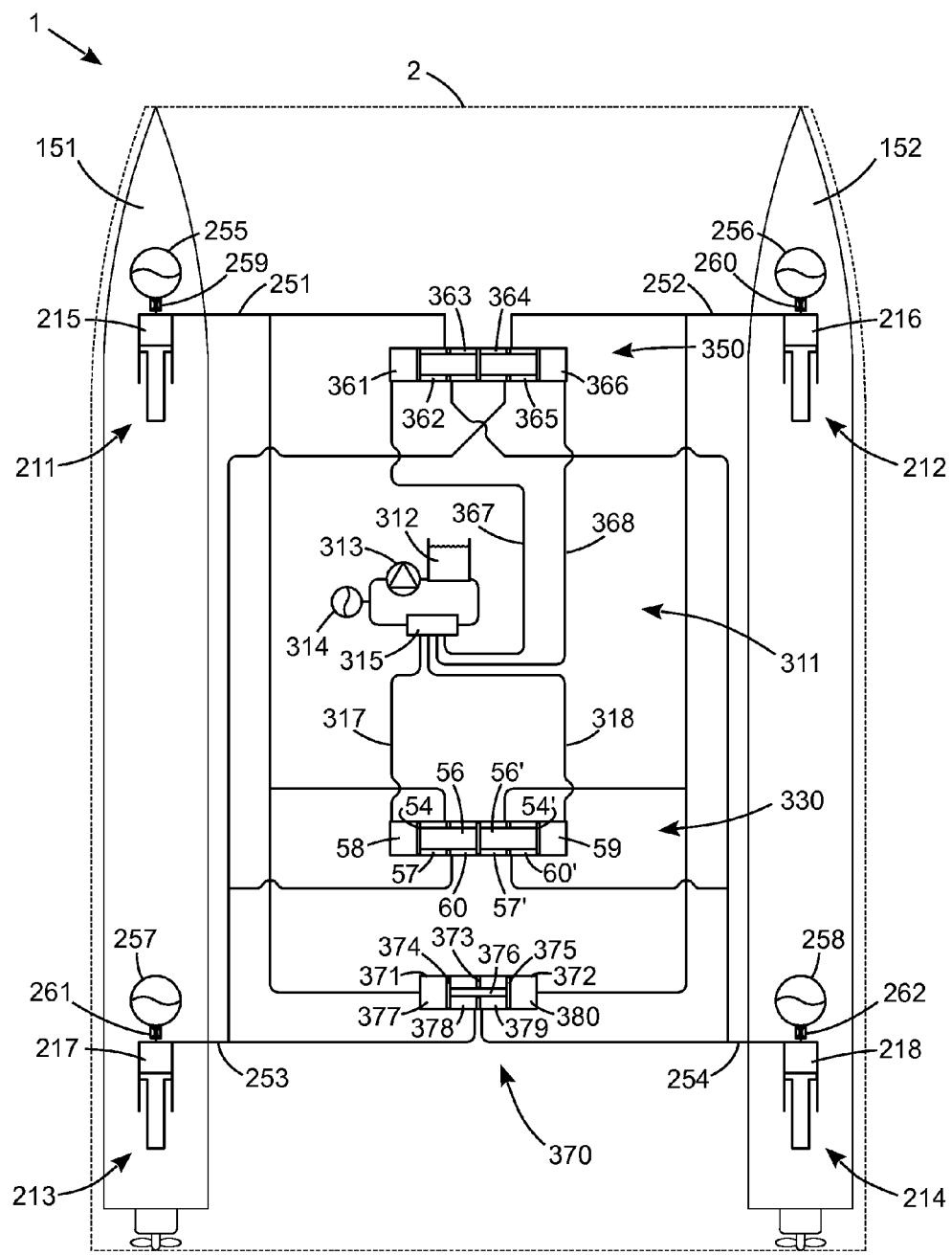
FIG. 12 is a diagrammatic plan view of a water craft in accordance with a further alternative embodiment of the present invention incorporating separate roll, pitch and warp devices.

FIG. 12 shows an alternative configuration of the suspension system where the two (i.e. the left and right) pitch displacement devices from FIG. 9 are combined into a single pitch displacement device 330, the two rods being joined together and the pitch resilience accumulators being (optionally) omitted. By using the single pitch displacement device 330 connected to each pitch support ram individually, the effective flow of fluid between the body pitch conduit front and back portions (i.e. between 251 and 253 and between 252 and 254) can be controlled in unison by a front pitch control chamber 58 and a back pitch control chamber 59 without interconnecting the left and right ram compression chambers (which would remove the roll stiffness and warp stiffness and roll attitude control from the pitch support rams). A fluid pressure control system 311 is shown connected to the front and back pitch control chambers 58, 59 by front and back pitch control conduits 317, 318 to enable active control of the pitch attitude of the body 2.

A similar roll displacement device 350 is shown to provide control of the effective flow of fluid between the front left and front right conduit portions (251, 252) and between the back left and back right conduit portions (253, 254). The roll displacement device 350 has respective front left, front right, back left and back right volume chambers (360, 365, 364, 363) respectively interconnected to the respective support ram compression chamber (215, 216, 217, 218). The left roll control chamber 361 increases in pressure as the pressure in the front and back left support ram compression chambers (215, 217) increases, so supplying pressurized fluid from the left roll control conduit 367 of the fluid pressure control system 311 will compensate when the body 2 of the water craft is leaning to the left. Similarly, the right roll control chamber 366 increases in pressure as the pressure in the front and back right support ram compression chambers (216, 218) increases, so supplying pressurized fluid from the right roll control conduit 368 of the fluid pressure control system 311 will compensate when the body 2 of the water craft is leaning to the right.

The warp displacement device 370 as shown is constructed in the same manner as the pitch displacement device 50 in FIG. 2c (i.e. using two cylinders divided by a dividing wall, and two pistons joined by a rod). The front left and back right volume chambers 377, 379 change volume in the same direction (i.e. both increase for example) and in the opposite direction to the front left and back right volume chambers (i.e. decreasing in volume, continuing the example) with motion of the piston rod assembly. The warp displacement device 370 thereby provides control of the effective flow of fluid between the front left and back left conduit portions (251, 252) and between the back right and front right conduit portions (254, 253), removing the warp stiffness of the arrangement of interconnected rams 211, 212, 213, 214 with removing the roll pitch or heave stiffness.

So in the suspension system of FIG. 12, the accumulators 255, 256, 257, 258 provide a common roll, pitch and heave stiffness, the warp displacement device 370 removing the warp stiffness, the pitch displacement device 330 providing control of body pitch attitude and the roll displacement device 350 providing control of the body roll attitude.

Figure 13:
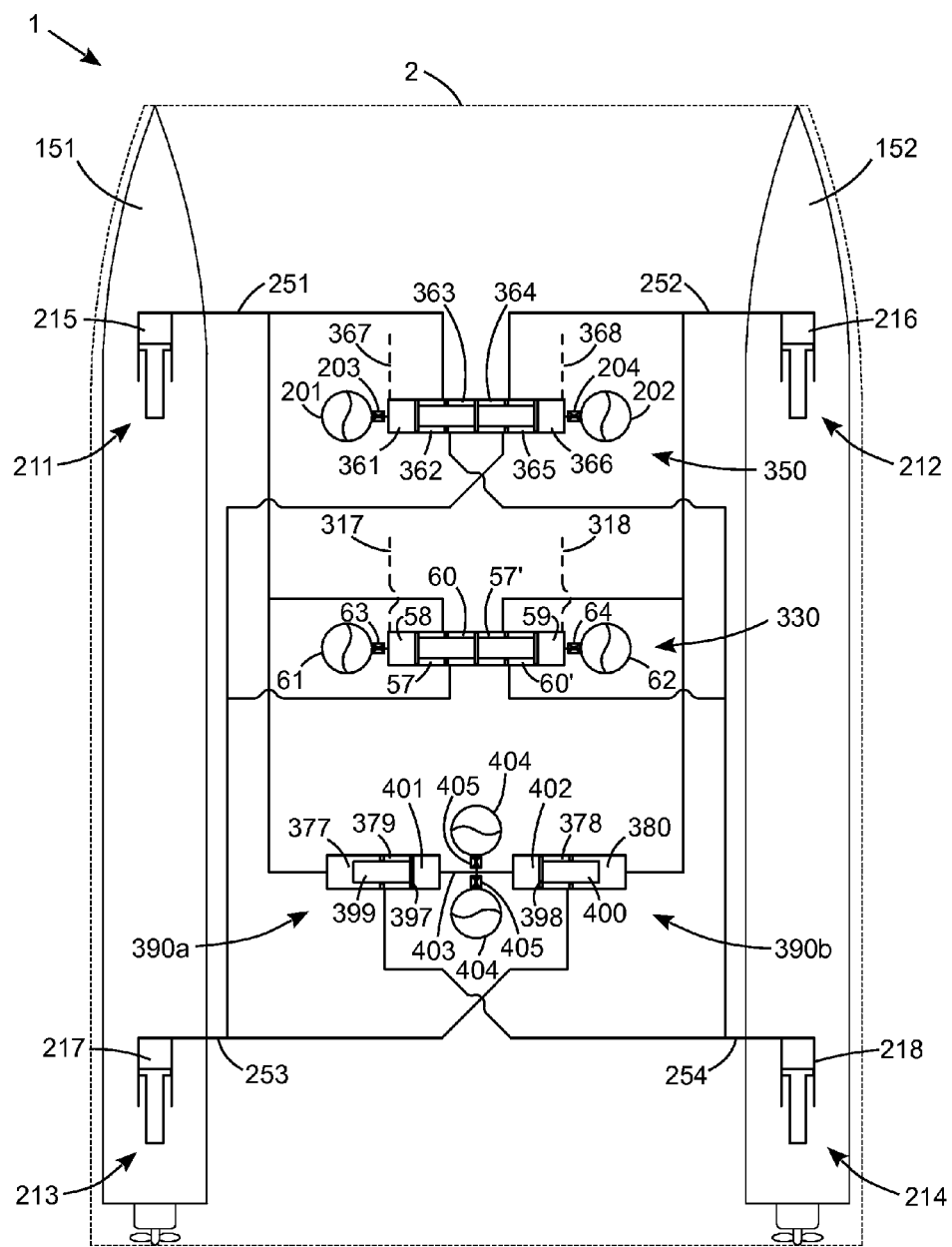
FIG. 13 is a diagrammatic plan view of a water craft showing modifications to the system in FIG. 12.

To enable the pitch and roll displacement devices (330, 350) to be used to add modal resilience into the suspension system of FIG. 12, accumulators can be provided on each device as shown in FIG. 13. Respective front and back pitch modal resilience accumulators (61, 62) are shown connected to the respective pitch control chambers 58, 59 via optional pitch modal resilience damper valves 63, 64 (so the pitch control chambers 58, 59 can once again be referred to as pitch modal resilience chambers). Similarly respective left and right roll modal resilience accumulators (201, 202) are shown connected to the respective roll control chambers 361, 366 via optional roll modal resilience damper valves 203, 204 (so the roll control chambers 361, 366 can be referred to as roll modal resilience chambers).

The warp displacement device 370 in FIG. 12 can be replaced by two heave and warp displacement devices 390*a* and 390*b* which are individually connected between diagonally opposite pairs of support rams. Each heave and warp displacement device 390*a*, 390*b* is of a similar construction to the similar-motion device 105 in FIG. 4, each having a piston 397, 398 fixed to a rod 399, 400 forming the three chambers in each. Each heave and warp displacement device is effectively a diagonal displacement device, in 390*a* the front left and back right volume chambers 377, 379 both work against a front left and back right volume chamber 401, and similarly in 390*b*, the front right and back left volume chambers 380, 378 both work against a front right and back left diagonal volume chamber 402. If each diagonal volume chamber was provided with an individual accumulator, the resilience of the accumulators would define the warp and heave stiffness of the suspension system. However, if the diagonal volume chambers are interconnected as shown using a warp conduit 403, effectively fluid can be transferred between the two pairs of diagonally opposite rams so the warp stiffness is removed. One or more heave accumulators 404 can be provided to add resilience between the relative motions of the two connected heave and warp displacement devices providing heave resilience to the suspension system.

The arrangement in FIG. 13 can be used as a passive suspension system with mode decoupled stiffness rates, or it can still incorporate active control, for example of the body pitch and roll attitude using the control conduits 317, 318, 367, 368. Similarly active control of heave could be provided, preferably by adjusting the pressure in the heave accumulator 406 via a control conduit (not shown) connected to the warp conduit 405 for example.

As the roll, pitch and heave and warp displacement devices in FIG. 13 provide resilience in the roll, pitch and heave modes and removes all stiffness in the warp mode, individual accumulators are no longer required in fluid communication with the individual support ram compression chambers (i.e. the accumulators 255, 256, 257, 258 in FIG. 12) and have been omitted in FIG. 13 for simplicity. However, to reduce fluid mass acceleration effects within the interconnected arrangement of rams, such accumulators can still be provided and used to tune the acceleration and frequency response of the suspension system.

Figure 14:
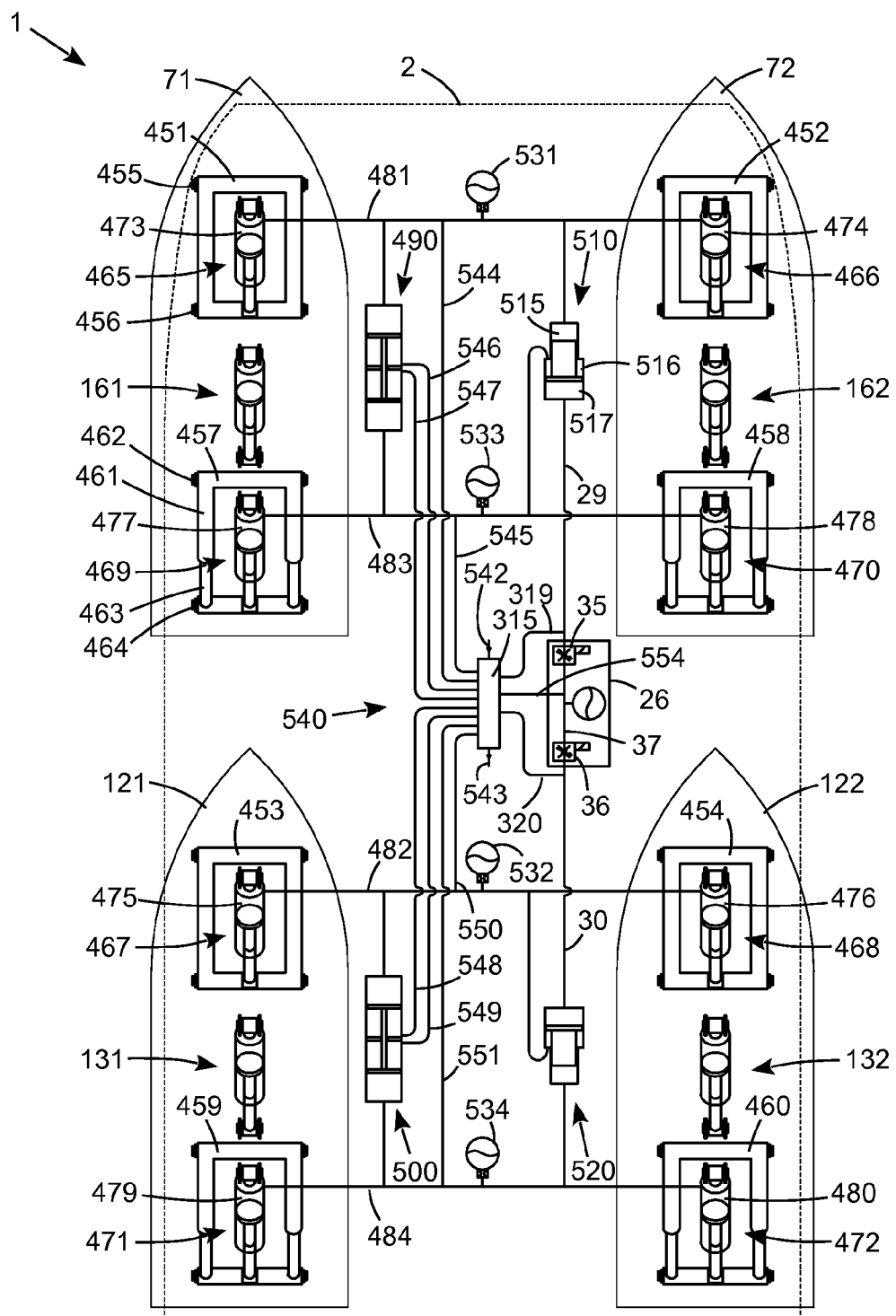
FIG. 14 is a diagrammatic plan view of a water craft in accordance with a further alternative embodiment of the present invention having four water engaging means and incorporates pitch control for the pitch attitude of the front and back water engaging means and for the body portion.

The water craft shown in FIG. 14 has a similar rectangular configuration of four pods to FIG. 7. Here the geometry of the locating means is shown, being of the trailing arm type in this example. Each pod (71, 72, 121, 122) is located relative to the body 2 by a forward arm 451, 452, 453, 454 which is rotatably connected to the body by a substantially laterally aligned joint 455 (numbering shown only for back right pod for clarity) and is rotatably connected to the pod by a similar substantially laterally aligned joint 456. The forward arm 451 is shaped like a rectangular frame since increasing the length of each joint 455 and 456 reduces the forces in each joint for any given roll or yaw moment and therefore enables better pod roll and yaw control. To further improve pod yaw stability, each pod is also connected to the body by a rearward arm 457, 458, 459, 460. To permit pitch motions of the pod relative to the body, the rearward arm comprises two parts, an upper part 461 rotatably connected to the body by a substantially laterally aligned joint 462 and a lower part 463 slidably received within the upper part and rotatably mounted to the pod by a substantially laterally aligned joint 464, i.e. the side portions of the rearward arms incorporate telescoping sections.

To enable control of pitch attitude of each pod in addition to pitch attitude of the body, a pod forward pitch support ram and a pod rearward pitch support ram is shown on each pod in addition to a double-acting roll ram 161, 162, 131, 132. For example, the front left pod 71 has a forward pitch support ram 465 and a rearward pitch support ram 469. The forward pitch support ram 466 of the front right pod 72 has its compression chamber 474 connected to the compression chamber 473 of the front left pod forward pitch support ram by a front pod forward pitch conduit 481 forming a front pod forward pitch volume. The rearward pitch support ram 470 of the front right pod 72 has its compression chamber 478 connected to the compression chamber 477 of the front left pod rearward pitch support ram 469 by a front pod rearward pitch conduit 483 forming a front pod rearward pitch volume.

Adjusting both pod pitch and body pitch support rams together, but in opposite senses generates pod pitch with no vertical displacement. As this involves simultaneous adjustment of both the front pod forward and rearward pitch compression volumes simultaneously, front pod pitch adjustment device 490 (having similar construction to the warp device 370 in FIG. 12) is shown to enable simpler control.

Adjusting both pod pitch and body pitch support rams together in the same direction generates a vertical pod displacement without adjusting the pitch attitude of the individual pod. The front pod pitch support ram displacement device 510 (or heave device as it acts in heave displacements) effectively sums the fluid displacement of the front pod forward and rearward pitch volumes. The device has a similar construction to the similar motion device 105 in FIG. 4, providing a forward pitch chamber 515 connected to the front pod forward pitch volume, a rearward pitch chamber 516 connected to the front pod rearward pitch volume, and a front pitch compression chamber 517 connected to the pitch device 26. As the front pitch compression chamber 517 has an effective piston area equal to the effective piston areas of the forward and rearward pitch chambers together, the front pitch compression chamber therefore gives the sum of fluid displacement from the four single-acting pod pitch support rams of the laterally spaced pair of front pods (and if the effective areas of the forward and rearward pitch chambers are equal, it also gives the average pressure). Alternate designs can give average displacement and sum of pressure. So the front pitch compression chamber 517 effectively corresponds to the front pitch compression volume in the earlier described embodiments and is therefore connected to the body pitch conduit front portion 29.

Similarly, towards the back of the water craft, the back left pod 121 has a forward pitch support ram 467 and a rearward pitch support ram 471. The forward pitch support ram 468 of the back right pod 122 has its compression chamber 476 connected to the compression chamber 475 of the back left pod forward pitch support ram by a back pod forward pitch conduit 482 forming a back pod forward pitch volume. The rearward pitch support ram 472 of the back right pod 122 has its compression chamber 480 connected to the compression chamber 479 of the back left pod rearward pitch support ram 471 by a back pod rearward pitch conduit 484 forming a back pod rearward pitch volume. A back pod pitch adjustment device 500 is shown connected between the back pod forward pitch conduit 482 and the back pod rearward pitch conduit 484 to enable simple adjustment or control of the average pitch attitude of the back left and right pods. A back pod pitch support ram displacement device 520 effectively sums the fluid displacement of the back pod forward and rearward pitch volumes.

Each of the (front and back pod) forward pitch volumes includes a fluid pressure accumulator 531, 533, and similarly (front and back pod) rearward pitch volume accumulators 532, 534 are provided. A damper valve or other flow control valve is shown between each accumulator and the respective pitch volume. Alternatively or additionally a damper valve or other flow control valve (not shown) can be provided between each pitch conduit 481 to 484 and its associated pitch support ram compression chambers 473 to 480.

The body pitch valve arrangement 26 shown in FIG. 9 is that from FIG. 2a, although other arrangements are possible.

A fluid pressure control system 540 is also shown in FIG. 9 and can be similar to that shown at 311 in FIG. 11, although components are omitted to reduce drawing complexity. A valve manifold 315 controls flow between a source of pressurized fluid 542, a drain 543 (to a low pressure reservoir or tank for example) and each individual hydraulic volume in the pitch support system. Conduits 544, 545 permit control of the front pod forward and rearward pitch volumes. Although the front pod pitch and heave devices (490, 500) allow the effective (not actual) transfer of fluid between pitch volumes, each sealed volume can require maintenance. For example, the actual volume of hydraulic oil in each volume needs to be maintained for the pod pitch and heave devices to remain within their operational stroke. Any leakage past seals, or change in temperature for example, can change the fluid volume. A certain amount of change can be allowed (i.e. a tolerance) as in many control systems to avoid unnecessary operation.

Conduits 546, 547, 548, 549 provide for (typically active) control of front and back pod forward and rearward pitch through the front and back pod pitch adjustment devices 490, 500. Conduits 550, 551 permit (typically maintenance) control of the back pod forward and rearward pitch volumes.

The provision of a conduit for each body pitch conduit portion which is connected to or part of a particular body pitch valve arrangement provides the maximum control options for that arrangement, although as all the body pitch conduit portions can be interconnected (with the opening of all control valves) it may not be necessary to provide the maximum number of control conduits. As the body pitch valve arrangement shown in FIG. 9 divides the body pitch conduit into a front portion 29, a back portion 30 and a mid portion 37, a respective control conduit 319, 320, 554 is shown for each. Using these three control conduits the body pitch and heave position can be actively controlled in addition to maintenance of body pitch and heave. If, when using a pitch device of the type shown, a large pressure difference exists between the front pitch compression volume and the back pitch compression volume, operation of the body pitch valve arrangement can be limited and can require fluid to be supplied and released using the three control conduits to maintain the pitch attitude and height of the water craft.

Figure 15:
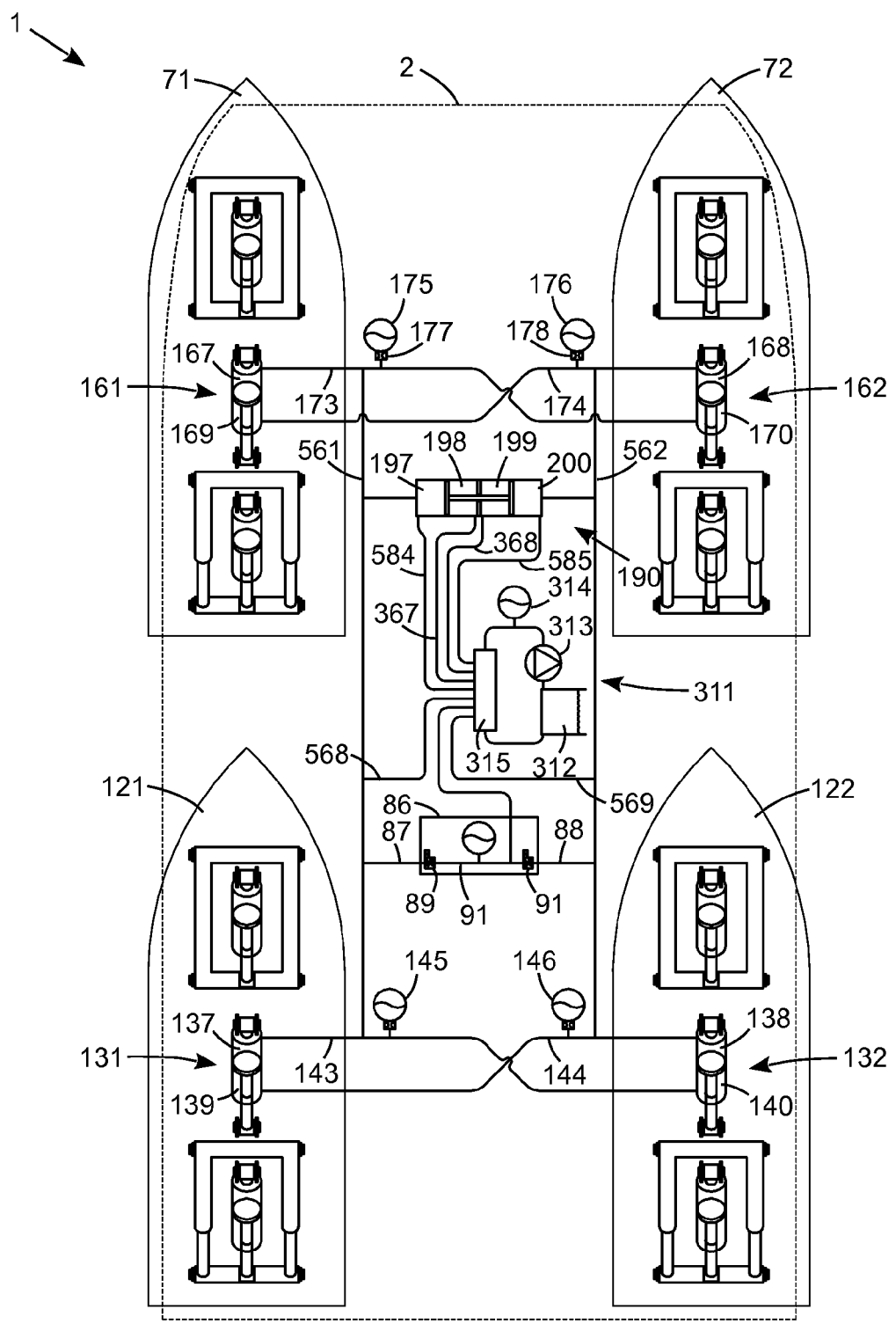
FIG. 15 is a diagrammatic plan view of the water craft of FIG. 14 showing the roll systems.

FIG. 15 shows the same water craft as FIG. 14, but with the pitch support conduits omitted and the roll conduits shown. The front and back roll systems are the same as those in FIG. 7 and comprise the same components. However they are also interconnected front to rear to form the same ram chamber connectivity as the roll circuit in FIG. 8 giving the same zero warp stiffness functionality. More specifically, the front left roll compression volume is connected to the back left compression by a left roll longitudinal conduit 561 between the front left roll compression conduit 173 and the back left roll compression conduit 143. This interconnects front left roll ram compression chamber 167, back left roll ram compression chamber 137, front right roll ram rebound chamber 170 and back right roll ram rebound chamber 140 into a left roll compression volume, although any layout of conduits that achieves the interconnection of these chambers into a single volume could be used. Similarly a right roll longitudinal conduit 562 interconnects the front right and back right roll compression volumes to form a right roll compression volume.

Although only a single left and a single right roll accumulator is shown in FIG. 8, in FIG. 14 front left and right and back left and right roll accumulators (175, 176 and 145, 146) are shown. Multiple accumulators in the left and right volumes can be used and controlled to switch between different levels of resilience and therefore provide switchable levels of roll stiffness.

Alternatively or additionally a body roll device 86 of the type utilizing a valve arrangement as discussed in relation to the embodiment shown in FIG. 3 can be connected between the left and right roll compression volumes to enable control of flow between the left and right roll compression volumes to reduce the roll accelerations on the body.

In FIG. 15 a fluid pressure control system 311 similar to that from FIG. 11 is also shown, including left and right roll compression volume control conduits 568 and 569. The fluid pressure control system can be used to simply maintain the pressure in the left and right roll compression volumes to provide the required roll stiffness. An additional control conduit 570 can be added, connected to the body roll conduit mid portion 91 to permit the accumulator pressure to be adjusted as part of a roll energy control system. Indeed if just roll system pressure maintenance was required the control conduit 570 together with left and right body roll valves 89 and 90 can achieve that function negating the need for conduits 568 and 569.

Alternatively, the fluid pressure control system 311 can be used to provide the feature of active roll control, providing a more rapid control of the left and right roll compression volumes through conduits 568 and 569. However, using direct connections to the roll compression volumes to adjust the roll attitude of the body also requires the control to regulate the pressure in the roll compression volumes which controls the stiffness of the roll system (if non-linear springs such as gas charged pressure accumulators are used as the resilient means). So a roll volume displacement device 190 (similar to that shown in FIG. 8) is shown in FIG. 15 as an addition to (or more likely as a replacement for) the body roll valve arrangement 86. If as shown, the left and right roll modal resilience chambers 198, 199 are not provided with accumulators, they can be more appropriately renamed left and right roll control chambers. If the left and right roll compression volume control conduits 568 and 569 were omitted, conduits 584 and 585 can be provided to enable maintenance of the volume of fluid in the left and right roll compression volumes.

The left and right roll control chambers 198, 199 can have relatively small effective piston areas if the rod is of large diameter which allows for a small volume of fluid at a high pressure to be used to control the attitude of the body. Control conduits 367, 368 communicate the left and right roll control chambers 198, 199 with the fluid pressure control system 311 to thereby drive the position of the piston rod assembly, displacing fluid between the left and right roll compression volumes and thereby adjusting the roll attitude of the water craft.

Figure 16:
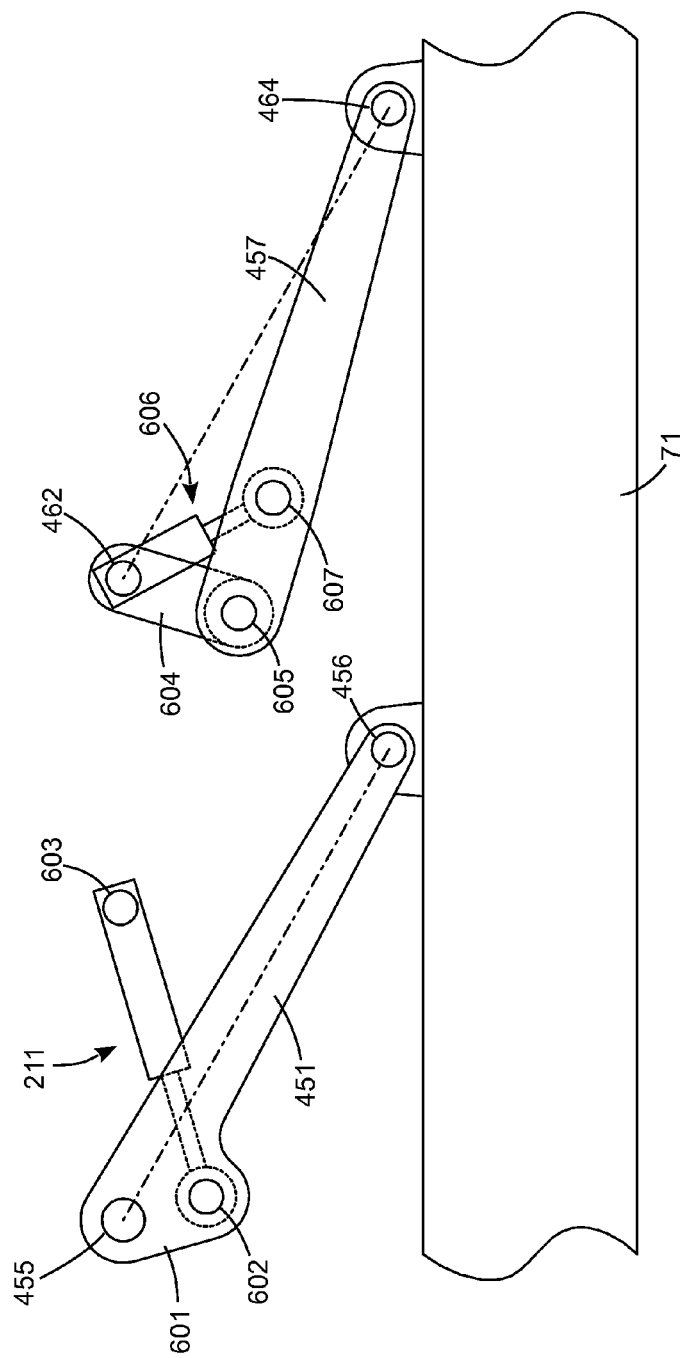
FIG. 16 is a diagrammatic side view of a locating means in accordance with the present invention.

The locating means can be any known geometry including wishbones, trailing arms, leading arms, drop links, sliding joints or other known types of multi-link suspension geometry. As an example, FIG. 16 shows an alternative geometry of locating means for a pod allowing vertical and pod pitch motions of the pod relative to the body. It shows a forward trailing arm 451 and a rearward trailing arm 457. The forward trailing arm is pivoted to the body (not shown) at the bearing, bushing or pivot point 455 and to the pod at the bearing or other pivot joint 456. Rather than mounting the support means or (modal/pitch) support ram 211 directly between the body and the pod which can require a long stroke ram with components exposed to the marine environment, it can be desirable to use a mechanical advantage or lever mount arrangement as shown. The trailing arm 451 includes a lever portion 601 to which one end (preferably the rod end) of the ram is connected by a pivot or other rotating joint 602. The other part of the ram (preferably the cylinder bore in this case) is connected to the body or chassis by another pivot or other rotating or flexible joint 603. This provides the function that as the distance between the pod and the body reduces, the ram is compressed. Some rams can be mounted such that they extend as the distance between the pod and the body reduces in which case, the compression and rebound chambers need to be redefined to ensure the correct connectivity and functionality within the suspension system is maintained.

The other trailing arm 457 between the body and the pod needs to allow some length change between the body mounting point 462 and the pod mounting point 464. In FIGS. 14 and 15 this was provided by a telescoping section in the side of the arm. In FIG. 16, a drop link 604 is provided between the body mounting point 462 and a joint 605 at the top end of the trailing arm 457. This provides roll and yaw location of the pod relative to the body. As the pod pitches relative to the body, the angle between the trailing arm 457 and the drop link 604 changes. This changing angle is regulated by a pod pitch ram 606 connected between the pivot axis of the body mounting point 462 and a pivot point 607 on the trailing arm 457. The pod pitch ram 606 is ideally a double acting ram to allow control of the forward and rearward pod pitch motions.

One advantage of this arrangement of rams and trailing arms is that all the suspension loads can be resolved within a structure such as a sub-frame, which is in turn mounted to the body or chassis. Such a sub-frame can include longitudinally and even laterally extending beams to distribute the suspension loads into the body over a large area, reducing the stresses on the body. The mounting of the sub-frame can be resilient to further improve the comfort of the vessel by providing additional isolation between the wave inputs and the body and if the motors are mounted in the pods, such resilient mounting will also providing some isolation from the engine noise and vibrations.

The use of a forward and a rearward pitch support ram on a single pod (to control pod pitch relative to the body as well as provide support) as shown in FIG. 14 can be applied to any other pod layout and is not restricted to the rectangular configuration of pods. Alternatively, the pod locating mechanism of FIG. 16 can be used to add pod pitch to any pod, as can other arrangements such as that shown in the applicant's U.S. Pat. No. 7,314,014.

The control of body pitch, roll and heave motions in the present invention can be generally used to minimize accelerations to the water craft body as discussed. However, the control can also or alternatively be used to control the body of the water craft with respect to another body (be it anything from a fixed dock or a floating pontoon to another water craft). This is primarily advantageous when transferring crew or cargo between the water craft and the other body. For example maintaining a constant, preferably minimized height between the operative deck areas or platforms of the water craft and the other body can make the operation of lifting containers to or from the other body much easier and safer. It can also be applied to service craft for the maintenance of other bodies where the relative motion can be minimized to increase ease of access and safety, or to water craft for transferring people and supplies out in open water, for example oil rigs.

Figure 17:
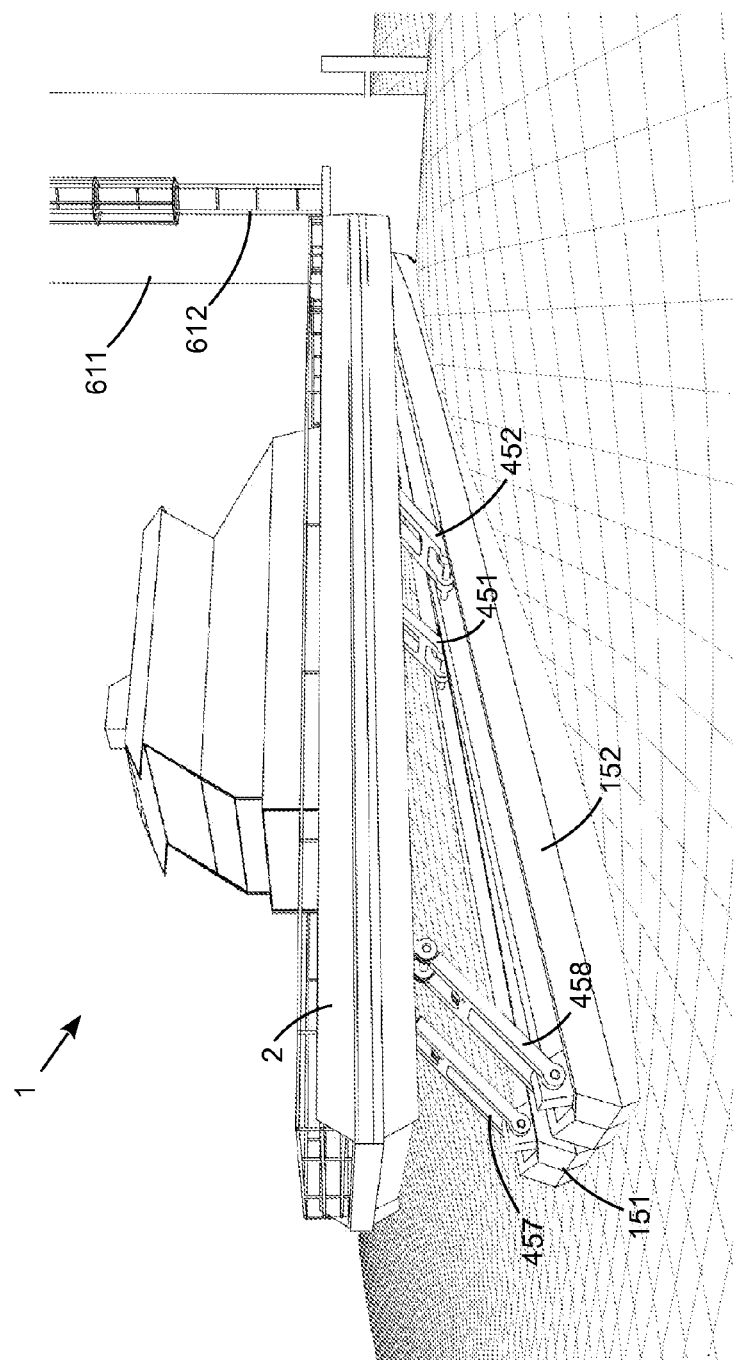
FIG. 17 is a perspective view of a water craft in accordance with the present invention.

FIG. 17 shows a catamaran version of the water craft 1, with its bow adjacent a leg 611, foundation or other similar part of an offshore structure. Active body control is being used to minimize the pitch of the body 2, reducing the motion between the bow of the water craft and the access ladder 612 on the leg 611 of the marine structure. The forward and rearward trailing arms 451 and 452 between the left hull 151 and the body 2 are replicated by forward trailing arm 452 and rearward trailing arm 458 between the right hull 152 and the body 2.

The use of active body control not only improves safety of transfers and increases the range of sea states in which transfers are possible, but it can also allow a simple passive gangway to be used in place of a powered, actively controlled gangway. However, if such active gangways are used, the sea states in which the offshore platforms are safely available is further increased.

The active control (particularly in the pitch mode, although control of multiple modes can improve the performance) can be used to power the body level for transfers, or to minimize the motion between for example the bow of the vessel (or the distal end of a gangway) and the offshore platform or structure. It can also be used to improve comfort during transit to reduce fatigue and allow any personnel or passengers to arrive at their destination in a more healthy condition, more alert and able to perform their duties with less time lost due to the effects of boat accelerations on the human body.

In the above description, the damper valves can be fixed simple restrictions, controlled variable restrictions, or multistage restrictions having flow areas which vary with flow velocity (typically utilizing fixed simple restrictions in combination with restrictions controlled by resilient components which deflect with damping pressure, such as springs and/or shims). The damper valves may be of a design that is able to be restricted down to zero or substantially zero flow or include a lockout valve in series.

Where the terms compression and rebound chambers of a ram are used, the compression chamber is a chamber which reduces in volume as the ram contracts and the rebound chamber is a chamber which reduces in volume as the ram extends.

Where both a single roll and a single pitch ram are both provided for a single pod, they can be combined into a one ram having the requisite number of chambers (as shown in FIG. 11).

Accumulators are generally shown adding resilience into the various fluid volumes defined above. Other sources of resilience include the fluid (various fluids can be used with varying compressibility from gases, through silicon liquid to hydraulic oil which has some limited compressibility especially with entrapped and entrained air), the conduits (such as pipes and hoses) and other forms of fluid pressure accumulator including mechanical resilience and bellows types.

Separate independent support means can be used, i.e. non-interconnected with potentially no modal decoupling functionality, such as coil springs 321, 322, 323 and 324 shown in FIG. 11. These can be used to help center the water craft in pitch. Alternatively or additionally they can be used to reduce the body support forces provided by the rams which can reduce the static pressure in the systems. The hydraulic systems can then be used to adjust body attitude and help maintain a level average body attitude over time without the requirement for a hydraulic fluid volume maintenance system to be running at least periodically. However the separate independent support means generally add warp stiffness and too much warp stiffness can reduce performance.

The body pitch and roll systems can be adapted to water craft having more than four pods. Linking the compression chambers of rams associated with longitudinally adjacent pods is one simple method of extending the systems to more pods. Many of the interconnection arrangements disclosed herein can also be overlaid in combination on layouts of more than four pods.

Optionally the body portion may contact water surface and partially support the body, so the pods may not provide sole support of the body. In that case, the contact of the body with the water surface may be continuous or it may be selectable. An example of selectable operation may be to lower the body into the water when moored in calm water or a marina and raised above the water surface during operation of the water craft at high speed such as transit situations (to improve efficiency and comfort for example) or when stationary in rough seas.

Although various exemplary embodiments of the invention have been disclosed, it should be apparent to those skilled in the art that various changes and modifications can be made which will achieve some of the advantages of the invention without departing from the true scope of the invention.

What is claimed is:

1. A water craft comprising a body portion and at least two water engaging means, the body portion being at least partially suspended above the at least two water engaging means by a suspension system, locating means being provided to connect each water engaging means to the body portion to permit substantially vertical and pitch direction motions of the water engaging means relative to the body, the suspension system including:
    at least one front pitch support ram and at least one back pitch support ram, the front and back pitch support rams providing support for at least a portion of the body relative to the at least two water engaging means;
    the at least one front pitch support ram including at least a compression chamber forming a front pitch compression volume and the at least one back pitch support ram including at least a compression chamber forming a back pitch compression volume; and
    a body pitch conduit connected between the front pitch compression volume and the back pitch compression volume, the body pitch conduit including a body pitch device dividing the body pitch conduit into a front body pitch conduit portion and a back body pitch conduit portion, the body pitch device controlling the effective flow of fluid between the body pitch conduit front and back portions.

2. A water craft as claimed in claim 1 wherein the at least two water engaging means include at least three water engaging means, wherein at least two of said water engaging means are laterally spaced,
    each left laterally spaced water engaging means including at least one respective left roll ram and each right laterally spaced water engaging means including at least one respective right roll ram, each roll ram including a compression chamber at least partially forming a respective left roll compression volume or right roll compression volume.

3. A water craft according to claim 2, wherein the at least three water engaging means include at least one front water engaging means, at least one back water engaging means and wherein said at least two water engaging means that are laterally spaced are a left water engaging means and a right water engaging means.

4. A water craft according to claim 1 wherein the at least two water engaging means are a left water engaging means and a right water engaging means,
    the at least one front pitch support ram including a front left pitch support ram and a front right pitch support ram, and the at least one back pitch support ram including a back left pitch support ram and a back right pitch support ram,
    the front left pitch support ram and the back left pitch support ram being disposed between the left water engaging means and the body portion,
    the front right pitch support ram and the back right pitch support ram being disposed between the right water engaging means and the body portion.

5. A water craft according to claim 4 wherein the compression chamber of the front left pitch support ram is connected to the compression chamber of the front right pitch support ram by a front pitch compression conduit so as to form the front pitch compression volume, and
    the compression chamber of the back left pitch support ram is connected to the compression chamber of the back right pitch support ram by a back pitch compression conduit so as to form the back pitch compression volume,
    the pitch support rams thereby providing substantially no roll stiffness to resist roll motions of the body portion of the water craft,
    the water craft further including respective front and back roll rams for each water engaging means, wherein
    each roll ram includes at least a compression chamber, the compression chambers of the front left and back left roll rams forming at least one left roll compression volume and the compression chambers of the front right and back right roll rams forming at least one right roll compression volume.

6. A water craft according to claim 1 wherein the at least two water engaging means includes at least a front left water engaging means, a front right water engaging means, a back left water engaging means and a back right water engaging means, the at least one front pitch support ram including a front left pitch support ram and a front right pitch support ram disposed between said water engaging means and the body portion, and the at least one back pitch support ram including a back left pitch support ram and a back right pitch support ram disposed between said water engaging means and the body portion.

7. A water craft according to claim 6 wherein the compression chamber of the front left pitch support ram is connected to the compression chamber of the front right pitch support ram by a front pitch compression conduit so as to form the front pitch compression volume, and the compression chamber of the back left pitch support ram is connected to the compression chamber of the back right pitch support ram by a back pitch compression conduit so as to form the back pitch compression volume, the pitch support rams thereby providing substantially no roll stiffness to resist roll motions of the body portion of the water craft, the water craft further including a respective roll ram for each water engaging means, wherein each roll ram includes at least a compression chamber, the compression chambers of the front left and back left roll rams forming at least one left roll compression volume and the compression chambers of the front right and back right roll rams forming at least one right roll compression volume.

8. A water craft according to claim 7 wherein the at least one left roll ram includes a front left roll ram and a back left roll ram, the at least one right roll ram includes a front right roll ram and a back right roll ram, and each roll ram is single acting, the compression chambers of the front left and back left roll rams being connected together to form a single left roll compression volume and the compression chambers of the front right and back right roll rams being connected together to form a single right roll compression volume.

9. A water craft according to claim 7 wherein the at least one left roll rain includes a front left roll ram and a back left roll ram, the at least one right roll ram includes a front right roll ram and a back right roll ram, and each roll ram further includes a rebound chamber, the front left roll ram compression chamber, front right roll ram rebound chamber, back left roll ram compression chamber and back right roll ram rebound chamber being interconnected to form a left roll compression volume, and the front right roll ram compression chamber, front left roll ram rebound chamber, back right roll ram compression chamber and back left roll ram rebound chamber being interconnected to form a right roll compression volume.

10. A water craft as claimed in claim 2 wherein at least one of said roll compression volumes is in fluid communication with a respective resilient device.

11. A water craft as claimed in claim 2 further including a fluid pressure control system including a fluid pump and at least one valve to thereby enable control of the roll attitude of the body.

12. A water craft as claimed in claim 2 further including a body roll conduit connected between the left roll compression volume and the right roll compression volume, the body roll conduit including a body roll device dividing the body roll conduit into a body roll conduit left portion and a body roll conduit right portion, the body roll device controlling the effective flow of fluid between the body roll conduit left and right portions.

13. A water craft according to claim 1, the at least one front pitch support ram further including at least one rebound chamber forming a front pitch rebound volume, the front pitch rebound volume being connected to and forming part of the back pitch compression volume.

14. A water craft according to claim 1, the at least one back pitch support ram further including at least one rebound chamber forming a back pitch rebound volume, the back pitch rebound volume being connected to and forming part of the front pitch compression volume.

15. A water craft as claimed in claim 1 wherein the body pitch device includes a pitch displacement device.

16. A water craft as claimed in claim 15 wherein the pitch displacement device includes at least two cylinders and a piston rod assembly slidably located in the at least two cylinders, the at least two cylinders and piston rod forming at least a front pitch modal chamber connected to the front pitch compression volume, a back pitch modal chamber connected to the back pitch compression volume, a front pitch resilience chamber and a back pitch resilience chamber, the front pitch chamber varying in volume in the same direction as the back pitch resilience chamber and in the opposite direction to the back pitch chamber and the front pitch resilience chamber with motion of the piston rod assembly relative to the at least two cylinders.

17. A water craft as claimed in claim 1 wherein at least one of said front and back pitch compression volumes is in fluid communication with a resilient device.

18. A water craft according to claim 1 further including a fluid pressure control system including a fluid pump and at least one valve to selectively communicate the fluid pressure control system with at least one of the front or back pitch compression volumes to thereby enable control of the pitch attitude of the body.

19. A water craft as claimed in claim 1 wherein the suspension system further includes at least one independent support device to provide partial support of the body.

20. A water craft as claimed in claim 1 wherein the body pitch device is controllable so as to permit, prevent or restrict flow of fluid through the body portion conduit front and back portions towards and/or away from the front and back pitch compression volumes.

21. A water craft according to claim 5, wherein the at least one left roll ram includes a front left roll ram and a back left roll ram, the at least one right roll ram includes a front right roll ram and a back right roll ram, and each roll ram is single acting, the compression chambers of the front left and back left roll rams being connected together to form a single left roll compression volume and the compression chambers of the front right and back right roll rams being connected together to form a single right roll compression volume.

22. A water craft according to claim 5, wherein the at least one left ram includes a front left roll ram and a back left roll ram, the at least one right roll ram includes a front right roll ram and a back right roll ram, and each roll ram further includes a rebound chamber, the front left roll ram compression chamber, front right roll ram rebound chamber, back left roll ram compression chamber and back right roll ram rebound chamber being interconnected to form a left roll compression volume, and the front right roll ram compression chamber, front left roll ram rebound chamber, back right roll ram compression chamber and back left roll ram rebound chamber being interconnected to form a right roll compression volume.

23. A water craft according to claim 4, comprising at least a front left roll ram and a back left roll ram and at least a front right roll ram and a back right roll ram, wherein each roll ram includes at least a compression chamber, the compression chambers of the front left and back left roll rams forming at least one left roll compression volume and the compression chambers of the front right and back right roll rams forming at least one right roll compression volume.

24. A water craft according to claim 6, comprising at least a front left roll ram and a back left roll ram and at least a front right roll ram and a back right roll ram, wherein each roll rain includes at least a compression chamber, the compression chambers of the front left and back left roll rams forming at least one left roll compression volume and the compression chambers of the front right and back right roll rams forming at least one right roll compression volume.

* * * * *